United States Patent
Kishore et al.

(10) Patent No.: US 9,785,897 B2
(45) Date of Patent: Oct. 10, 2017

(54) METHODS AND SYSTEMS FOR OPTIMIZING EFFICIENCY OF A WORKFORCE MANAGEMENT SYSTEM

(71) Applicant: Infosys Limited, Bangalore (IN)

(72) Inventors: Pradeep Kishore, Chennai (IN); Visvanathan Lakshmi Narayan, Chennai (IN)

(73) Assignee: Infosys Limited, Bangalore (IN)

( * ) Notice: Subject to any disclaimer, the term of this patent is extended or adjusted under 35 U.S.C. 154(b) by 28 days.

(21) Appl. No.: 14/754,309

(22) Filed: Jun. 29, 2015

(65) Prior Publication Data

US 2015/0302346 A1 Oct. 22, 2015

Related U.S. Application Data

(63) Continuation-in-part of application No. 13/111,472, filed on May 19, 2011, now abandoned.

(30) Foreign Application Priority Data

Apr. 7, 2011 (IN) .......................... 1189/CHE/2011

(51) Int. Cl.
*G06Q 10/06* (2012.01)
*G06Q 10/10* (2012.01)
*G01C 21/36* (2006.01)

(52) U.S. Cl.
CPC ... *G06Q 10/063118* (2013.01); *G01C 21/362* (2013.01); *G06Q 10/06* (2013.01); *G06Q 10/103* (2013.01); *G06Q 10/105* (2013.01)

(58) Field of Classification Search
CPC .......... G06Q 10/063118; G06Q 10/06; G06Q 10/103; G06Q 10/105; G01C 21/362
See application file for complete search history.

(56) References Cited

U.S. PATENT DOCUMENTS

2004/0203854 A1* 10/2004 Nowak ................... H04W 4/02
455/456.1
2006/0148492 A1* 7/2006 Inaba ..................... H04M 3/42
455/456.1

(Continued)

OTHER PUBLICATIONS

"How Far Can I Travel HTML Source," http://www.freemaptools.com/how-far-can-i-travel.htm, as archived on Mar. 30, 2010.*

*Primary Examiner* — Courtney Heinle
(74) *Attorney, Agent, or Firm* — Klarquist Sparkman, LLP

(57) ABSTRACT

Methods, apparatuses, and computer-readable media for optimizing efficiency of a workforce management system include receiving a service request, the service request including a service location, transmitting the service location to a plurality of map service providers, receiving geospatial coordinates and a corresponding confidence score from each map service provider which corresponds to a precision accuracy and indicates an estimated accuracy of the geospatial coordinates to the service location, calculating a plurality of overall scores for the plurality of map service providers based at least in part on the precision accuracy of each map service provider and a plurality of attributes associated with each map service provider, selecting a map service provider from the plurality of map service providers based at least in part on the plurality of overall scores, and transmitting geospatial data including coordinates provided by the selected map service provider to a technician.

19 Claims, 19 Drawing Sheets

(56) References Cited

U.S. PATENT DOCUMENTS

| | | | |
|---|---|---|---|
| 2010/0312604 A1* | 12/2010 | Mitchell | G06Q 10/06 705/7.13 |
| 2012/0257785 A1* | 10/2012 | Narayan | E21B 44/00 382/100 |
| 2013/0046738 A1* | 2/2013 | Kuo | G06Q 30/0631 707/690 |
| 2015/0302346 A1* | 10/2015 | Kishore | G06Q 10/06 705/7.17 |

* cited by examiner

Assign a first ranking to the precision accuracy of the map service provider based at least in part on a plurality of precision accuracy ranking tiers

901

Assign a second ranking to the roads attribute based at least in part on a plurality of roads attribute ranking tiers

902

Assign a third ranking to the available imagery attribute based at least in part on a plurality of available imagery attribute ranking tiers

903

Assign a fourth ranking to the geographical suitability attribute based at least in part on a plurality of geographical suitability attribute ranking tiers

904

Calculate an overall score for the map service provider based at least in part on the first ranking, the second ranking, the third ranking, and the fourth ranking.

905

Fig. 9 w = weight of each contributing factors x = Rank of the each contributing factor Overall Score For Each Map Provider =x1w1 + x2w2 + x3w3 ... xnwn

| Contributing factors | Ranking Tiers | Rank | Weightage | Index |
|---|---|---|---|---|
| Precision accuracy with Confidence score | < 7m | 4 | 30% | 1.20 |
| | 8 to 10 | 3 | | 0.90 |
| | 10 - 15 | 2 | | 0.60 |
| | >50 | 1 | | 0.30 |
| Roads attribute | Road intersections | 3 | 25% | 0.75 |
| | Point of Interest (POI) | 2 | | 0.5 |
| | Turn-by-Turn direction | 1 | | 0.25 |
| Available Imagery Attribute | Satellite imagery | 4 | 25% | 1 |
| | Geotagged photos | 3 | | 0.75 |
| | Handheld based photos | 2 | | 0.5 |
| | 3D view | 1 | | 0.25 |
| Geographic Suitability Attribute | Cities and Suburban | 2 | 20% | 0.4 |
| | Tier1 & Tier 2 Cities only | 1 | | 0.2 |

| Contributing factors | Preferred Index |
|---|---|
| Precision accuracy with Confidence score | >0.9 |
| Roads attribute | >0.5 |
| Available Imagery Attribute | >0.5 |
| Geographic Suitability Attribute | >0.4 |

1003

Fig. 10C

METHODS AND SYSTEMS FOR OPTIMIZING EFFICIENCY OF A WORKFORCE MANAGEMENT SYSTEM

RELATED APPLICATION DATA

This application is a continuation-in-part of application Ser. No. 13/111,472, filed May 19, 2011, which itself claims priority to Indian Patent Application No. 1189/CHE/2011, filed Apr. 7, 2011, both of which are hereby incorporated by reference in their entirety.

BACKGROUND

Workforce management strives to get the right number of technicians in the right places at the right times to maximize service and minimize cost. Optimization is difficult since it involves intelligent scheduling and dispatching of multiple technicians to different locations, while minimizing cost and maintaining good customer service. Workforce management may be useful, for example, for companies that need to manage a field force of technicians for installations or servicing existing systems. Typical workforce management systems may interface with ticket management systems to schedule and assign jobs to technicians. Optimal workforce management, however, requires more than an optimal schedule for technicians. Immediate and unexpected changes, such as changes in technician status or unforeseen changes in the workload, may require spontaneous adjustments.

Some current workforce management systems provide map centric tools, such as the systems provided by CLICK-SOFTWARE™. These systems attempt to optimize efficiency by scheduling and dispatching a qualified technician to a location near the technician. However, these workforce management systems generally come bundled with land base data (e.g., maps or other cartographical data). The bundled land base data may quickly become out-of-date and result in less than optimal scheduling and dispatch. This may also lead to inaccurate driving instructions being provided to a technician, thus further reducing efficiency.

Further, typical workforce management systems may contribute to inefficiencies due to lack of real time location data. For example, a typical system may see that a technician was scheduled to do a job at a first location and, thus, ad hoc schedule this same technician to assist with an emergency repair at a location near the first location. However, if technician finished the first job they may no longer be near the first location. Typical workforce management systems fail to adopt dynamic scheduling and real-time dispatch using real-time location data to increase efficient allocation.

Finally, typical standalone workforce management systems are resource intensive, expensive to operate, and difficult to integrate with other enterprise level systems. For example, a company may purchase a custom made workforce management system to manage field technicians. These systems may be cost preclusive for small companies. Additionally, these systems may be difficult to integrate with allied systems, for example technician time entry systems, ticket management systems, vehicle tracking systems, payroll and benefits systems, human resources systems, and the like.

BRIEF DESCRIPTION OF THE DRAWINGS

FIG. 9 illustrates a flowchart for calculating an overall score for a map service provider in a plurality of map service providers according to an exemplary embodiment.

FIGS. 10A-10C illustrate an example of the criteria, ranking tiers, and weights that can be used for the process shown in FIG. 9.

While systems and methods are described herein by way of example and embodiments, those skilled in the art recognize that systems and methods for workforce management are not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Disclosed embodiments provide computer-implemented methods and systems for managing a workforce. Embodiments may be configured to reduce operational costs through managing unplanned and ad hoc jobs generated due to emergency, short service level agreement ("SLA") times, missed appointments, and the like. Embodiments may implement Geographic Information System ("GIS") based location intelligence and location based services to optimize work force allocation and management. Embodiments may also integrate with existing and allied systems, such as trouble ticket systems, field force tracking systems, and the like.

Figure 1:
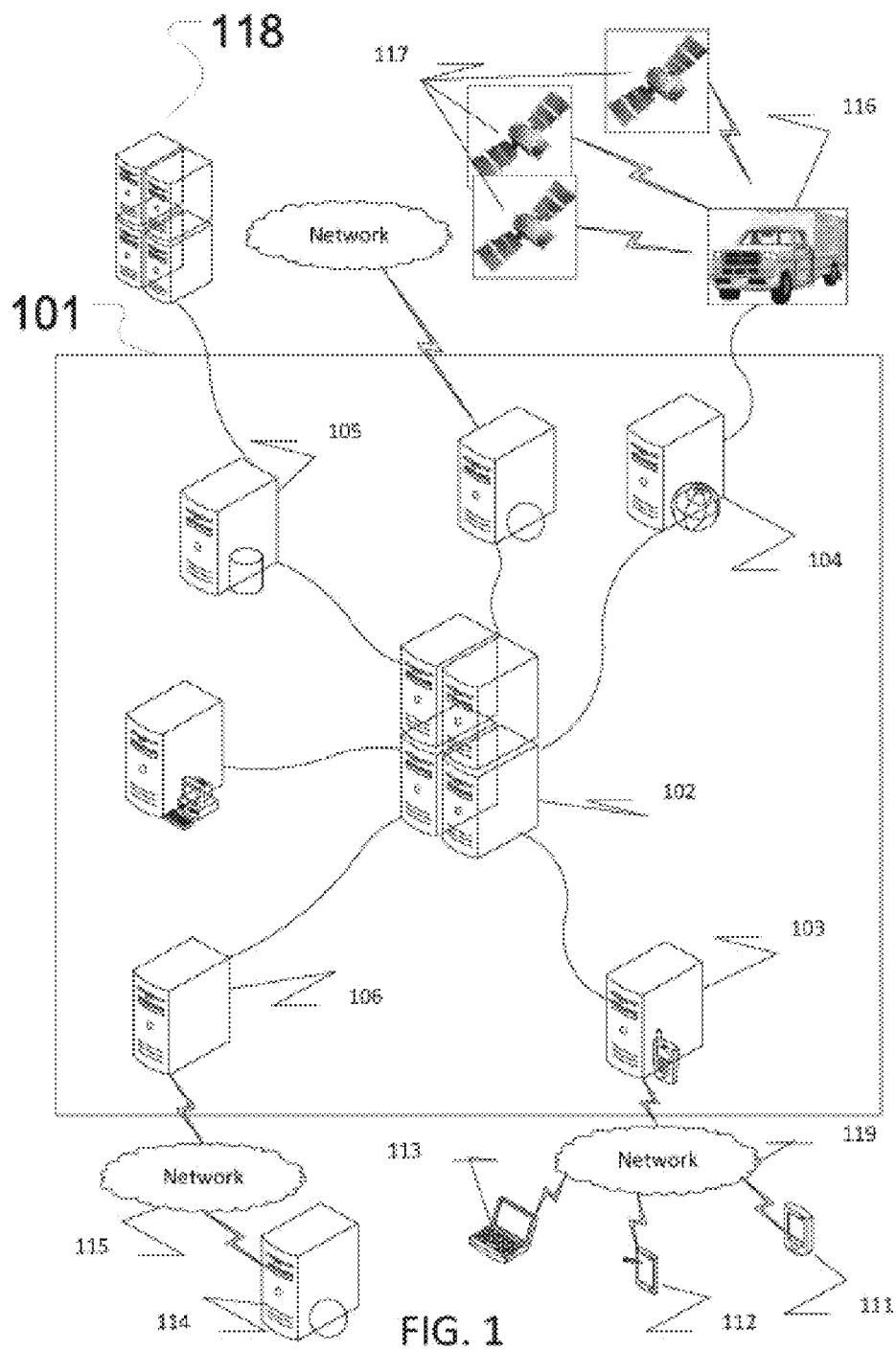
FIG. 1 shows a functional block diagram of a workforce management system.

FIG. 1 shows a functional block diagram of a workforce management system ("WFMS") 101. WFMS 101 may include one or more workforce management computing device(s) 102 configured to effectively plan and dispatch field service technicians (or other field operatives). In addition to scheduling planned work tickets, workforce management computing device 102 may be configured to dispatch technicians substantially in real-time in response to ad hoc work tickets (e.g., in the case of an emergency). Workforce management computing device 102 may be operatively coupled to an integration computing device 105 for integrating with allied and existing systems 118.

Integration computing device 105 may be a computing device configured to integrate existing and allied computing systems 118 with workforce management computing device 102. For example, integration computing device 105 may include one or more data stores configured to convert data from allied and existing systems 118 into a format useful for workforce management computing device 102. For example, integration computing device 105 may be configured to receive trouble tickets from a ticketing system, for example REMEDY™, that may need to be assigned to a technician from an existing system 108 and convert the trouble tickets into a format required by workforce management computing device 102. Integration computing device 105 may, alternatively or in addition, perform services to assist in integration, for example caching services to speed data access for workforce management computing device 102. Integration computing device 105 may be configured to convert data from legacy systems to formats useful for the workforce management system 101 and then replace the functionality of the legacy systems. For example, integration computing device 105 may convert existing trouble tickets to a required format then, going forward, receive all new trouble tickets and, thus, replace the legacy system.

While integration computing device 105 is described above as integrating workforce management computing device 102 with a trouble ticket system, integration computing device 105 may integrate with any allied and existing systems, for example inventory systems, human resource systems, reporting systems, scheduling systems, customer relation systems, and the like. Alternatively, integration computing device 105 may be omitted, thereby allowing existing and allied systems 118 to be operatively coupled directly to workforce management computing device 102. Further, integration computing device 105 may be configured to provide various systems, such as trouble ticket systems, if no such systems previously existed or to simply replace such existing systems.

System 100 also includes a technician interface computing device 103 operatively coupled to workforce management computing device 102. Technician interface computing device 103 may be operatively coupled to one or more technician computing device, for example over a network 119 such as the Internet, a local area network ("LAN"), a wide area network ("WAN"), mobile service provider network (e.g., from VERIZON™ WIRELESS), and the like. Technician interface computing device 103 may be coupled to technician computing devices such as a laptop 114, a tablet 112 (e.g., an IPAD™), a smartphone 111 (e.g., an IPHONE™, a BLACKBERRY™, or an ANDROID™ based phone). Of course, these devices are exemplary only, and technician interface computing device 103 may also be coupled to custom-made computing devices, conventional cell phones (i.e., dumbphones), personal computers, set top boxes, or any other communication device. Technician computing devices may be useful for providing an interface for technicians to view and interact with work tickets assigned to the technician, for example accept a work ticket, decline a work ticket, update the status of a work ticket, and the like. Exemplary user interfaces are discussed below with reference to FIGS. 3A-B and 4A-D. Technician computing devices may also provide routing instructions relating to a work ticket (e.g., by showing directions on a map), provide a technician with access to allied and existing systems (e.g., provide access to a payroll or time entry system), and the like. In some embodiments, network 119 may be a private network. For example, for a WFMS 101 configured to manage a workforce of security personnel it may be desirable to transmit classified data only over a secure, private network.

WFMS 101 also may include a vehicle tracking computing device 104 configured to track one or more vehicles 116, such as work trucks driven by technicians. Each vehicle 116 may be equipped with one or more sensors configured to determine the vehicle's location and transmit the location to vehicle tracking computing device 104. For example, vehicle 116 may be equipped with a Global Positioning System ("GPS") sensor configured to receive signals from plural GPS satellites 117 to determine its position. Vehicle 116 may be operatively coupled to vehicle tracking computing device 104, for example over a radio frequency connection, such as over a mobile service provider network or other network connection. Vehicle 116 may transmit various data to vehicle tracking computing device 104, for example the location of the vehicle. Of course, the vehicle may transmit any additional information, such as diagnostic information about the vehicle 116 (e.g., a check engine indication), inventory information regarding inventory available in the vehicle 116 (e.g., inventory of replacement parts), and the like. Vehicle tracking computing device 104 may store vehicle tracking information for a determined period of time. Of course, alternatively WFMS 101 may be operatively coupled to an existing or allied vehicle tacking computing device via integration computing device 105 rather than, or in addition to, including vehicle tracking computing device 104.

WFMS 101 may also include a mapping integration computing device 106 configured to integrate map information from one or more map services 114 with workforce management computing device 102. Mapping integration computing device 106 may be coupled to one or more map services 114, such as GOOGLE™ MAPS services, ESRI™ ARCGIS™ online services, YAHOO!™ MAPS services, MICROSOFT™ BING™ MAPS services, and the like, for example over an Application Programming Interface ("API") via network 115. Mapping integration computing device 106 may include mapping information in a GIS, for example using ESRI™ ARCSDE™. Mapping integration computing device 106 may include a Feature Manipulation Engine ("FME"), an integrated collection of spatial extract, transform, and load ("ETL") tools for spatial data transformation and translation. Mapping integration computing device 106 may use an FME to convert spatial data from a Spatial Database Engine ("SDE") format to Keyhole Markup Language ("KML"), an eXtensible Markup Language ("XML") schema for expressing geographic annotation and visualization within Internet-based, two-dimensional maps and three-dimensional Earth browsers, such as the services provided by GOOGLE™ MAPS. KML may be useful for inserting objects, such as overlays, images, icons, and the like, into a map. The objects may correspond to service requests, the current location of technicians, warehouses or other locations for technicians to resupply, and the like. Of course, alternative embodiments may utilize alternative engines or systems other than FTE.

For example, an embodiment may integrate a map into a webpage or application via the mapping services like GOOGLE™ MAPS API, BING™ MAPS API, and the like. Such embodiments may overlay various data points and objects on the map corresponding to technician locations, truck locations, technician service areas, work locations, warehouses, offices, and the like. The various data points and objects may be selectable so that a user, such as a technician, may determine which should be displayed on a user interface. Data points and objects may be displayed depending on a profile of each user. For example, a technician's profile may provide that only work tickets assigned to that technician should be displayed on the technician's user interface while a dispatcher's profile may provide that all technicians' locations should be displayed on the dispatcher's user interface.

Of course, while FIG. 1 shows WFMS 101 comprising several independent computing devices, alternative embodiments may include one or more computing devices implementing WFMS 101. Such embodiments may execute modules corresponding to the various computing device shown in WFMS 101.

Figure 2:
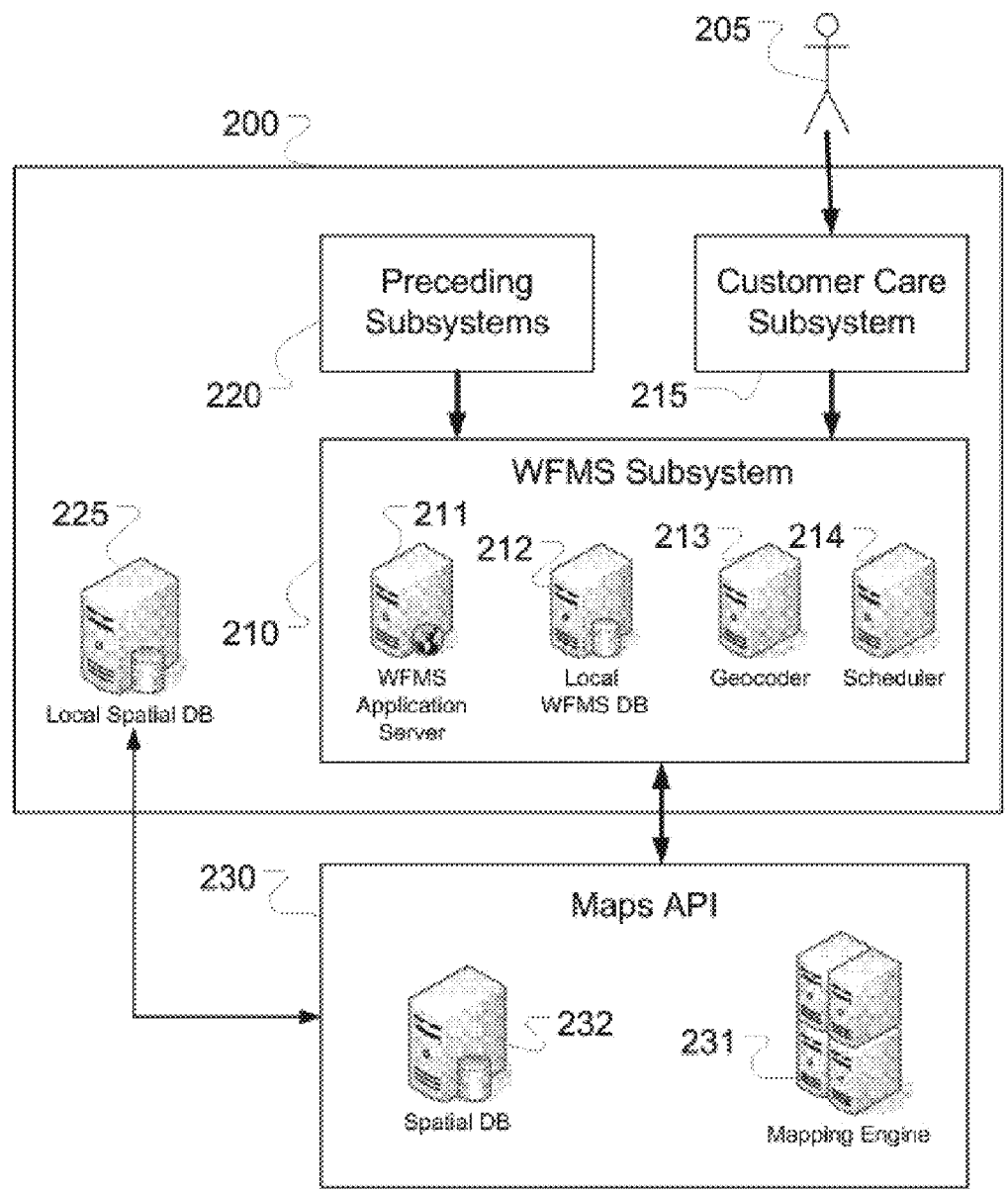
FIG. 2 shows an exemplary workforce management system architecture having a workforce management subsystem operatively coupled to a maps API.

FIG. 2 shows an exemplary WFMS architecture 200 having a WFMS subsystem 210 operatively coupled to a maps API 230. In operation, a user 205 may place a request for customer service with a customer care subsystem 215. For example, a user 205 having problems with their internet service provider may call a service number to place a service request. A call center operator may then enter the service request into the customer care system 215. Alternatively, a user 205 may enter a service request directly into the customer care subsystem, for example through a web interface. Of course, these methods are exemplary only, and customer care subsystem 215 may receive service requests from a user 205 in any fashion.

Upon receiving a service request, customer care subsystem 215 may classify the service request, convert the service request into a service ticket (i.e., a trouble ticket or a work ticket) in an appropriate format for WFMS subsystem 210, and forward the service ticket to WFMS subsystem 210. Once a service ticket is received by WFMS subsystem 210, the service ticket may be reclassified according to the service area, the ticket type, and the priority and then allocated to one or more field operatives. A local WFMS database 212 may store all service tickets. The service tickets may, for example, be stored in a job assignment table with a ticket status field initially being updated to "open" to indicate that the ticket is awaiting allocation to a technician.

A geocoder 213 within WFMS subsystem 210 may identify the service area corresponding to the service ticket. Geocoder 213 may then send a request to a maps API 230, for example GOOGLE™ MAPS API or ArcGIS™ online services, to request information regarding technicians in or near the service area. A mapping engine 231 may have access to local spatial data (e.g., showing service areas, real time technician locations from a technician tracking system, and the like) from a local spatial database 225 mapped to or overlaid on the mapping service's spatial data from a spatial data database 232. Mapping engine 231 may return through maps API 230 the identity, location, and additional information regarding technicians in or near the service area.

A scheduler 214 within WFMS subsystem 210 may receive the information from maps API 230 and filter the information to determine which technicians in the service area have the required skills and/or supplies to handle the ticket. Next, with the technicians filtered to identify the technicians in or near the service area and having the skill set and/or supplies to respond to the type of service request, the WFMS subsystem 210 may check the priority of the ticket. If a service ticket has the highest priority, then an available technician in the service area having the requisite skill set may be assigned to the service ticket by subsystem 210. If no available technicians in or near the service area have the requisite qualifications, then the technician in the service area with the requisite qualifications assigned to a job that is most likely to finish first may be assigned to the service ticket by subsystem 210. Further, if no technicians in the service area have the requisite qualifications, the nearest available technician outside the service area having the skill set, or the nearest available technician outside the service area having the skill set and most likely to complete their current task shortly may be assigned to the service ticket by subsystem 210.

Through scheduler 214, lower priority service tickets may be assigned dynamically to technicians in similar fashion to high priority service tickets. However, if higher priority service tickets exist in a service area, lower priority service tickets may be queued behind higher priority service tickets. Additionally, if a technician is assigned to a lower priority service ticket and has not yet arrived at the service location to do the work, the technician may be reassigned to the higher priority service ticket. In some instances, a ticket may have such high priority that one or more technicians may be reassigned even while they are working on a service ticket. For example, WFMS subsystem 210 may receive an emergency ticket and immediately (dynamically) reassign technicians to the emergency ticket. Thus, the technician assignment can be in either of two modes. For example, at the start of each work day, scheduler 214 may run to automatically assign tickets that are open (i.e., unassigned). Once the tickets start flowing in for the day (i.e., being received), dynamic scheduling may kick in and reassign technicians to tickets different from the ones already assigned. This dynamic scheduling may be based on current location of technicians and distance from the location of higher priority in addition to various parameters considered during the original scheduling.

Service tickets may have many different priority levels for example priority levels one to ten, with one being the highest priority and ten being the lowest. WFMS subsystem 210 may be configured to increase the priority of tickets the longer they remain unassigned. Priority level increases may be tied, for example, to SLA times or to the estimated time of arrival ("ETA") of a technician that was initially given a user 205 when they placed a service request. In other words, priority may be increased after a threshold is met, for example an SLA threshold or an ETA threshold.

As scheduler 214 in WFMS subsystem 210 assigns technicians to service tickets and as the technicians service the service tickets, WFMS subsystem 210 may update records in the local WFMS database 212 to reflect the same. For example, an assignment table with a ticket status field initially may be updated to "assigned", "in progress", "closed", and the like to indicate the status of the ticket. Additionally, a service ticket table in WFMS database 212 may be updated over time, for example to adjust the priority of a ticket as time passes, to remove, or otherwise flag, completed tickets, and the like.

Figure 3A:
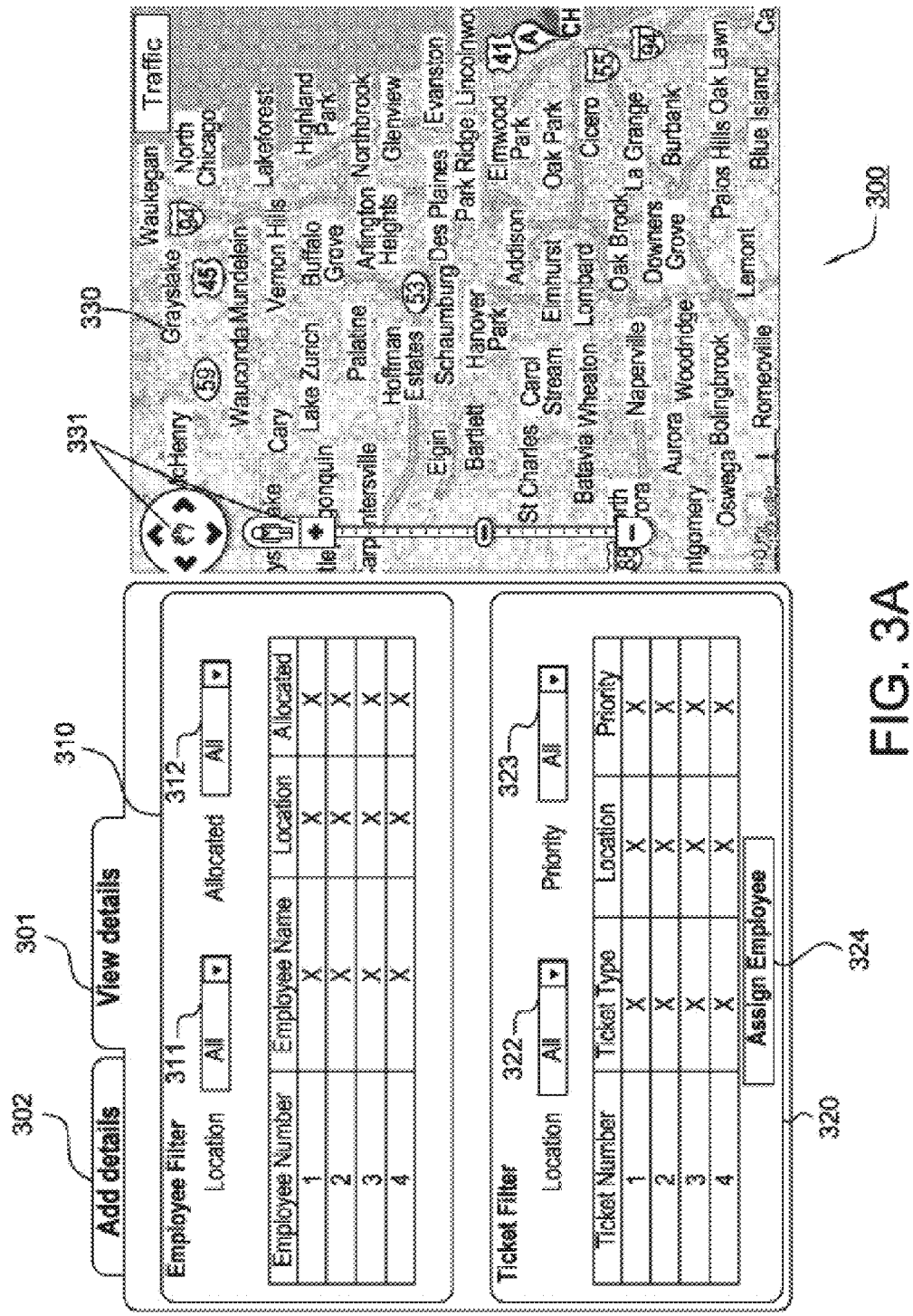
FIGS. 3A-B show exemplary user interfaces for interacting with a workforce management system.

WFMS application server 211 may provide a user interface ("UI") to WFMS subsystem 211. For example, WFMS application server 211 may provide a UI 300 as shown in FIG. 3A. UI 300 may include a view details tab 301 displaying an employee table 310 and a ticket table 320. Employee table 310 may show each technician, their location, and their allocation status. Employee table 310 may provide UI controls to allow a user to filter the data shown, for example a location filter 311 may be used by a user to display technicians only in or near a certain service area and an allocated filter 312 may be used by a user to display only technicians having certain allocated attributes (e.g., "available", "allocated", etc.). Ticket table 320 may show each service ticket, the ticket type, the location, and the priority of the ticket. Ticket table 320 may also include UI controls to allow a user to filter the data shown, for example a location filter 322 may be used by a user to display tickets only in a certain service area and a priority filter 323 may be used by a user to display tickets having a certain priority. Of course, while the UI controls are shown as drop-down menus, any UI controls may be used. Also, additional or different UI controls may be implemented to allow a user to filter data in various other ways.

UI 300 may also include an assign employee control 324. UI 300 may be configured to allow a user to select (e.g., highlight or click on) a technician in employee table 310, select a ticket in ticket table 320, and select assign employee control 324 to assign the technician to the ticket. Alternatively, when a user selects assign employee control 324, an additional user interface control may allow a user to select a technician to assign to a ticket.

UI 300 may also include a map 330. Map 330 may be a map retrieved from maps API 320 showing real time technician and service ticket indicators overlaid on an up-to-date map. Additionally, indicators on map 330 (not shown) may be displayed or hidden depending on a user's selection of various UI controls, for example location filter 311, allocated filter 312, location filter 322, and priority filter 323. Map 330 may additionally be overlaid with additional data from local spatial database 225, for example various service areas, locations of warehouses for supplies, and the like. Map 330 may additionally include various user controls 331 to allow a user to navigate (e.g., pan in various directions, zoom in or out, toggle on and off information such as traffic, satellite view, and the like, view a GOOGLE™ STREET-VIEW, etc.).

Figure 3B:
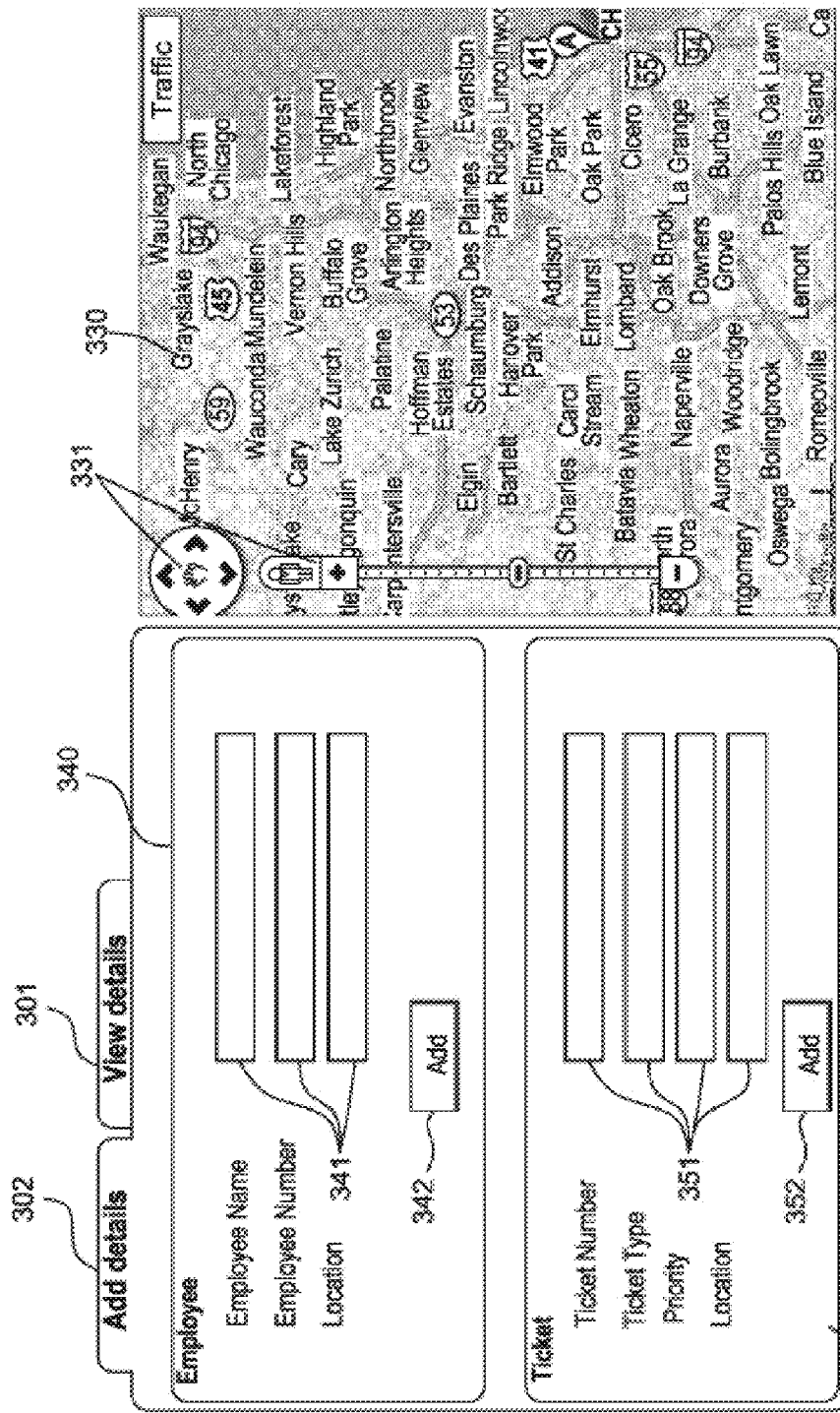

FIG. 3B shows an exemplary add details tab 302 of UI 300 including an add employee area 340 and an add ticket area 350. Add details tab 302 may be useful, for example, for a user, such as a call center employee, to enter new work tickets and new technicians into the WFMS subsystem 210. Add employee area 340 may include multiple fields 341 for a user to input data about a technician and a UI control 342 for the user to enter the data about the technician into the WFMS subsystem 210. Add ticket area 350 may likewise include multiple fields 351 for use to input data about a work ticket and a UI control 352 for the user to enter the data about the work ticket into the WFMS subsystem 210. Once a new technician or work ticket is entered into the WFMS subsystem 210, an object may appear overlaid on map 330 indicating the technician or work ticket. Of course, different or additional data may be entered for each technician and/or work ticket.

Figure 4A:
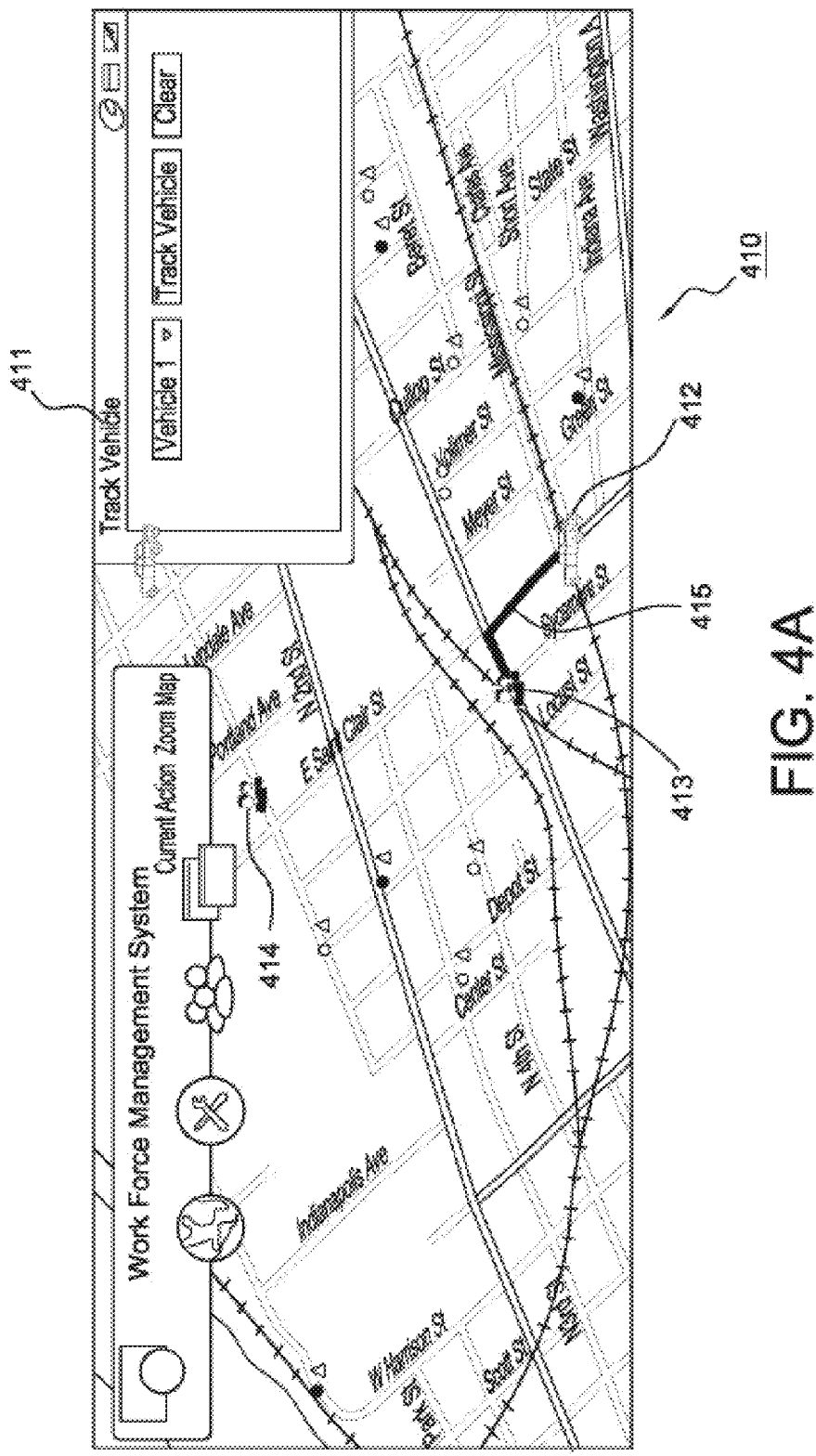
FIGS. 4A-D show additional exemplary user interfaces for interacting with a workforce management system.

WFMS subsystem 210 may additionally provide UIs corresponding to other features. For example, FIG. 4A shows an exemplary vehicle tracking UI 410. UI 410 may include a track vehicles control area 411 configured to provide a user with controls to indicate one or more vehicles to track, toggle on and off vehicle tracking, clear the map of vehicle tracking, and the like. For example, a user may select to track a vehicle 412. As vehicle 412 moves, a GPS sensor in vehicle 412 may track the location of vehicle 412 and a system within vehicle 412 may be configured to substantially continuously or periodically (e.g., every minute) transmit the vehicle's location to WFMS 200 of FIG. 2. In this fashion, WFMS 200 may update the data to overlay a map provided by a map service provider 230 to display up-to-date location information of vehicle 412. UI 410 may additionally display a vehicle trail 415 showing turn by turn path vehicle 412 travels. For example, UI 410 shows vehicle trail 415 showing the route vehicle 412 traveled after leaving a work ticket location 413. UI 410 may be useful for ensuring that a technician travels directly from one work location 413 to another work location 414, thereby saving both time and gas and optimizing the response of the workforce. Vehicle trail 415 in UI 410 shows that vehicle 412 is traveling in the opposite direction of a work location 414, thus a dispatcher may contact the technician to inform them of the error.

Figure 4B:
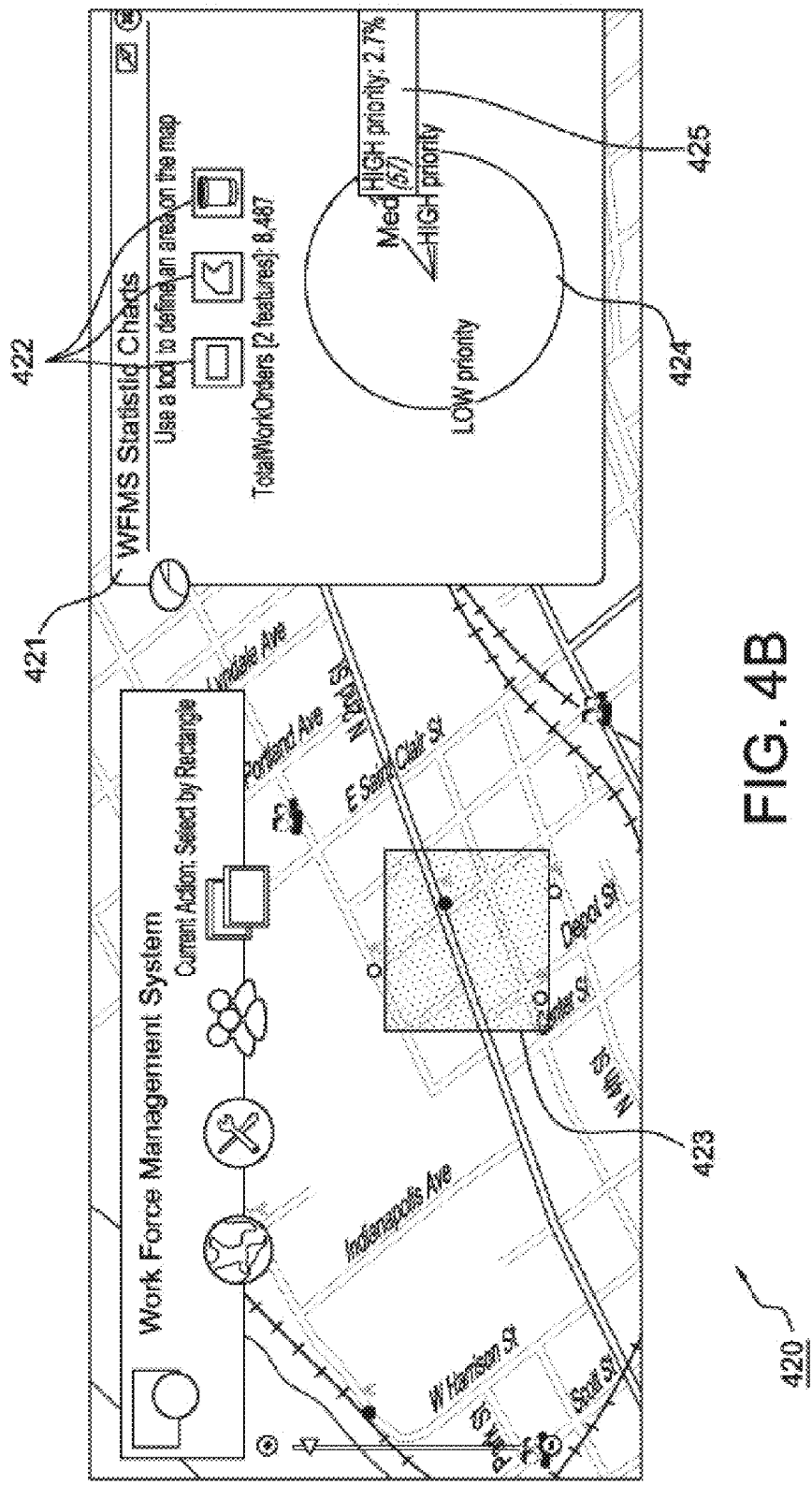

FIG. 4B shows an exemplary WFMS statistics UI 420. WFMS statistics UI 420 may include a statistics charts control area 421 configured to provide a user with controls 422 to select one or more areas 423 of the map and statistics 424 related to the areas 423 of the map. For example, a user may select a tool 422 that allows the user to click and drag a cursor to define a rectangular area 423 on the map. Statistics 424, such as a pie chart, may show statistics related to the selected area 432. The exemplary statistics 424 pie chart shown in FIG. 4B shows that the vast majority of the work orders in the selected area 432 are low priority, a smaller amount are medium priority, and a small percent are high priority. Statistics charts control area 421 may additional display text 425 or other indicators with statistics, such as showing that 2.7% of the work orders are high priority. Of course, UI 420 may show real time statistics in alternative formats, such as by displaying other or additional graphs or charts. By enabling a user to quickly see real time statistics, the WFMS may be substantially continuously adjusted to maintain a sufficient workforce where demand exists while limiting a workforce when the need for a large workforce does not exist.

Figure 4C:
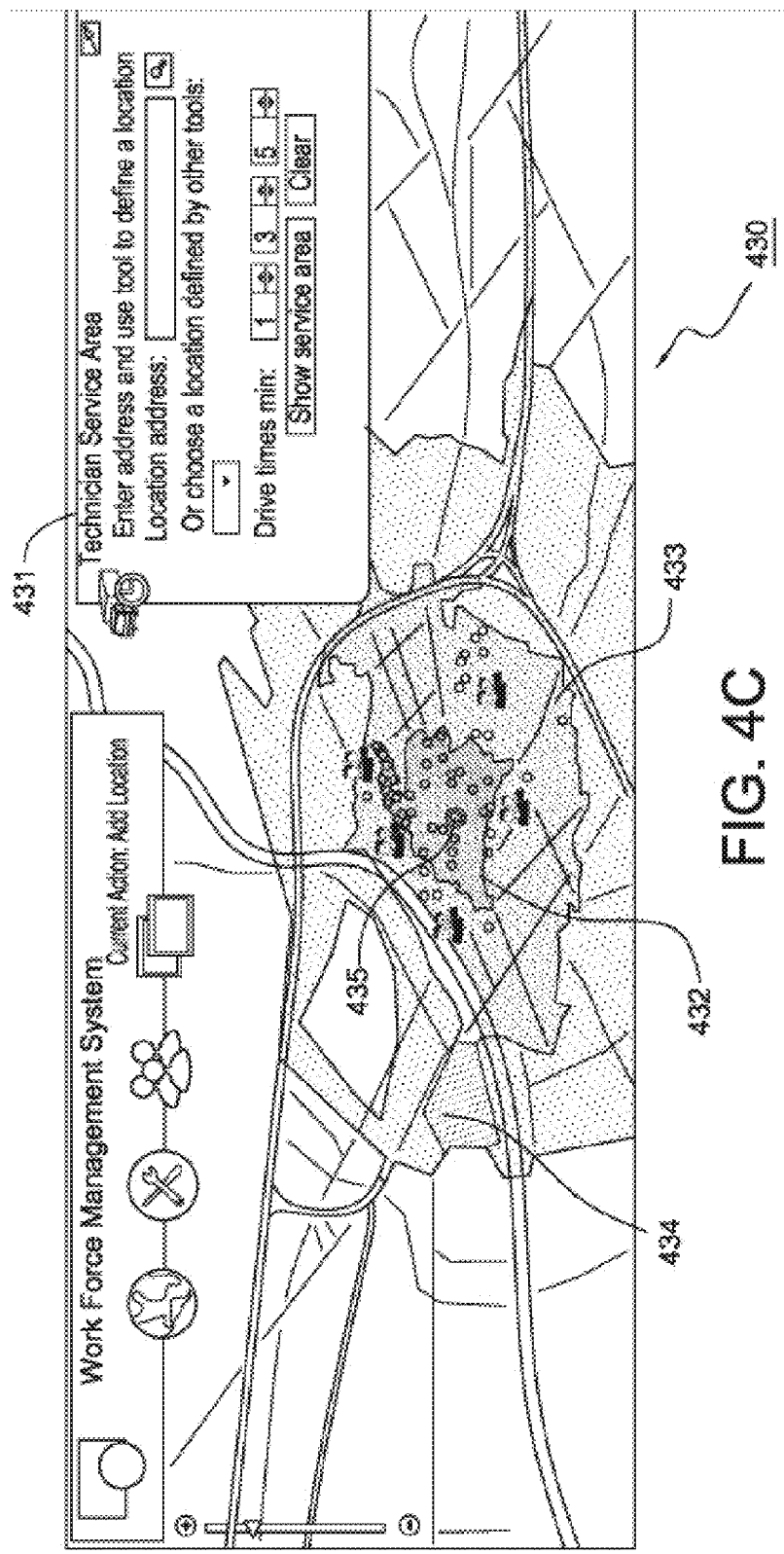

FIG. 4C shows an exemplary technician service area UI 430. Technician service area UI 430 may include technician service area control 431 configured to allow a user to select the technician whose service area they would like to see overlaid on the map as well as various other options related to display of the technician's service area. For example, a user may select a technician 435 and indicate that they would like to see a first service area 432, a second service area 433, and a third service area 434 for technician 435. In the technician service area 431 a user may indicate how they would like the service areas determined, for example the first service area 432 may encompass locations the technician can drive to within 3 minutes, the second service area 433 may encompass locations the technician can drive to within 10 minutes, and the third service area may encompass locations the technician can drive to within 15 minutes.

The location of the technician 435 may be retrieved in real time from a vehicle tracking subsystem in or coupled to WFMS 200. A map API 230 may then be queried for locations that the technician 435 would be able to travel to within the time constraints set for the first service area 432, the second service area 433, and the third service area 434. By maps API 230 providing ranges based on driving time rather than merely based on physical distance, WFMS 200 may optimize scheduling of technicians. For example, as shown in FIG. 4C, service areas may follow highways or roads, therefore allowing a technician proximate a major highway reach a work order location faster than another technician who may be physically closer to the work order location.

Figure 4D:

FIG. 4D shows an exemplary landscape UI 440 showing a GOOGLE™ STREETVIEW of a location. For example, a user of any of the UIs shown in FIGS. 4A, 4B, and 4C may select a user control to see landscape UI 440 of a particular location on the map. This may be useful, for example, for a technician traveling to a location to confirm that the location be arrives at corresponds to the work location. This may also be useful for a technician en route to determine if they are on the right path.

Of course, additional UIs may be displayed. For example, a directions UI may be useful for providing directions to a work location to a technician. For example, WFMS 200 may request directions from a technician's real-time location to a work order location by transmitting a request for directions to a maps API 230. Maps API 230 may then return a map including the directions overlaid thereon, thereby providing a technician with turn-by-turn directions to a work order location.

Independent of the particular method used to transmit directions to a technician, WFMS system 200 may be useful for optimizing a technician's response route, thereby both decreasing the technician's response time as well as potentially decreasing the technician's fuel expenses. Thus, by providing a map based system a workforce of technicians may be optimized to provide technicians with requisite skill sets in various work areas to respond to user demand.

Methods and systems are also disclosed which allow for the precise location of assets in order to avoid missing any trouble tickets due to an incorrect location provided by a map service provider. Location inaccuracy due to map data can lead to many negative repercussions such as customer dissatisfaction, revenue loss, and service disruption.

Figure 5:
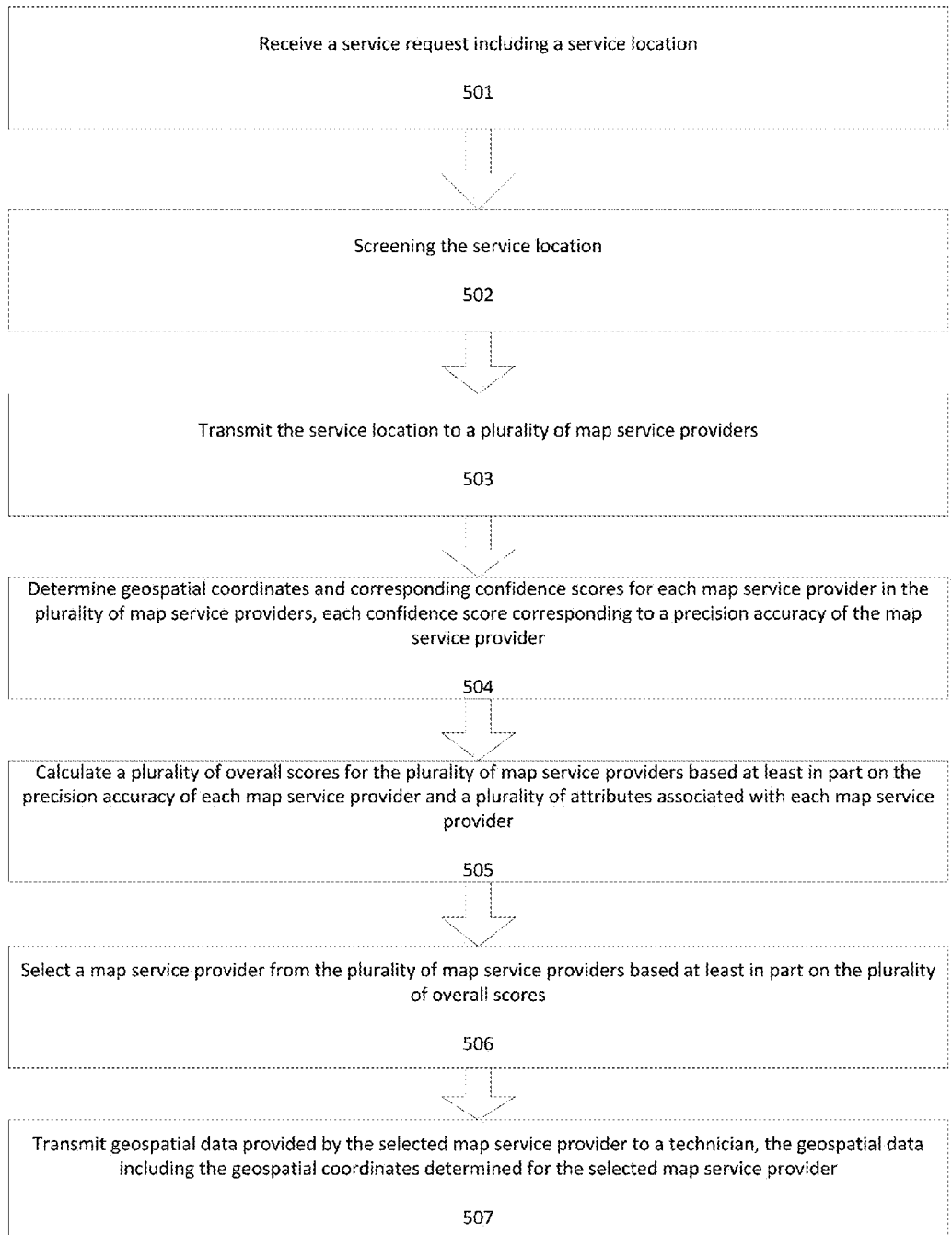
FIG. 5 illustrates a method for optimizing efficiency of a workforce management system according to an exemplary embodiment.

FIG. 5 illustrates a method for optimizing efficiency of a workforce management system according to an exemplary embodiment. At step 501 a service request is received, such as any of the service requests described earlier in this application. As discussed earlier in the specification, one or more request processing steps can be performed after the request is received. For example, the request can be classified, converted into a service ticket or work ticket in an appropriate format, and re-classified by a workforce management subsystem.

The service request can include a service location, such as a textual address, a point-of-interest, and/or geospatial coordinates. As shown at step 502 of FIG. 5, the method can optionally include screening the service location to confirm the validity of the service location. For example, if the service location is a textual address, then the textual address can be screened by an address validation logic prior to transmission to a plurality of map service providers (step 503).

Figure 6:
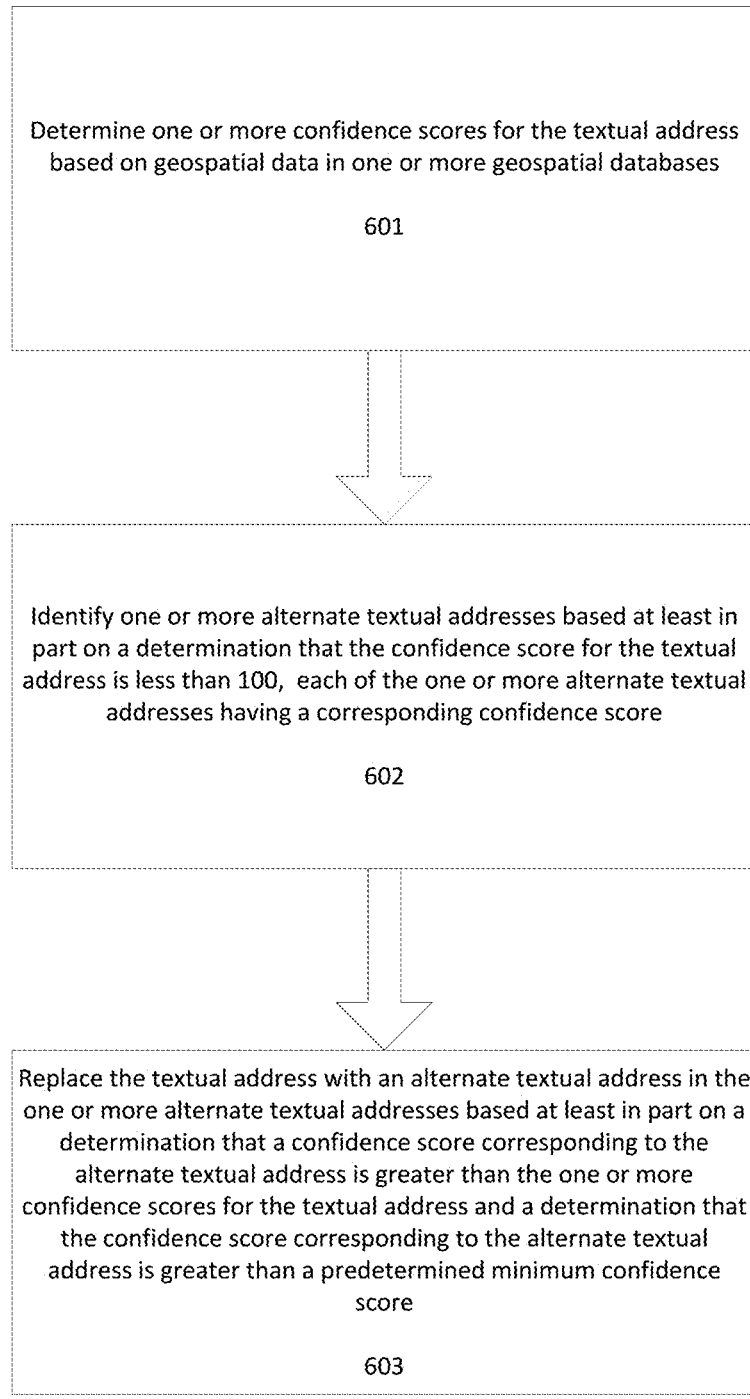
FIG. 6 illustrates a flowchart for screening a textual address according to an exemplary embodiment.

FIG. 6 illustrates a flowchart for screening a textual address according to an exemplary embodiment. At step 601, one or more confidence scores are determined for the textual address based on geospatial data in one or more geospatial databases. For example, the textual address can be sent to two different geospatial databases (map service providers) to return two different confidence scores from the geospatial databases corresponding to the textual address.

Confidence scores can be provided by map service providers wherever address matching is handled. When an input is provided (in the form of XY, textual address, landmarks etc.) the map provider can position the location exactly on their map data and provide an output of the exactness of the location in the form of a confidence score (such as a percentage). The confidence score can vary depending on the location in the input. The scores can be internally determined by the map service provider based on robust address matching algorithms and detailed map data information (such as scale, detailed street networks, address, door numbers, etc.).

These confidence scores can indicate the likelihood that the textual address comprises a valid address, according to the data in each of the one or more geospatial databases. In addition to the degree of matching of the address data to known valid address data, additional factors can also be utilized to determine the confidence score, such as the scale/units of the maps, the amount of data available in the maps (such as proper road names, door numbers, sequence of numbers on different sides of a street, etc.) and the precision accuracy associated with a map data provider.

Additionally, the confidence scores can be assumed to correspond to the precision accuracy of each of the geospatial databases. Precision accuracy (absolute/relative) is the measure or indicator of how accurately an object is positioned on the map with respect to its true position on the ground, with reference to the standard coordinate systems. This can be derived and validated based on the type of source data (paper, satellite imagery, hand drawn), scale at which source data are collated and captured, survey methods (GPS/EDM, aerial or field survey), etc. The precision accuracy can be measured and reported in ground units (Decimal degrees (DD) or Degree minutes seconds (DMS) by each of the geospatial databases, which can be map service providers. Therefore, a geospatial database (such as a geospatial database corresponding to a particular map service provider) can be assumed to have a confidence score corresponding to its precision accuracy and the confidence score can be determined based on a correlation with a particular precision accuracy corresponding to the geospatial database. Alternatively, the precision accuracy can serve as a proxy for the confidence score. In other words, it can be presumed that map data with near real world accuracy provides a good confidence score.

At step 602 one or more alternate textual addresses are determined based at least in part on a determination that all of the one or more confidence scores for the textual address are less than 100. For example, if each of two confidence scores (received from two geospatial databases) corresponding to a textual address are less than 100, then that indicates that neither of the two geospatial databases can confirm, with 100% certainty, that the textual address is a valid address.

Therefore, one or more alternate textual addresses can be determined using different permutations of the original textual address, such as variations on the house number, street name or number, zip code, or city. Each of these alternate textual addresses can then be sent to the one or more geospatial databases and receive a corresponding confidence score (indicate the likelihood that the alternate textual address is a valid address).

At step 603 the textual address can be replaced with an alternate textual address in the one or more alternate textual addresses based at least in part on a determination that a confidence score corresponding to the alternate textual address is greater than the confidence score for the textual address and a determination that the confidence score corresponding to the alternate textual address is greater than a predetermined minimum confidence score. This predetermined minimum confidence score can be set at some user-defined level, to reflect some deference towards the originally provided textual address. For example, the predetermined minimum confidence score could be set to 95%.

Figure 7:
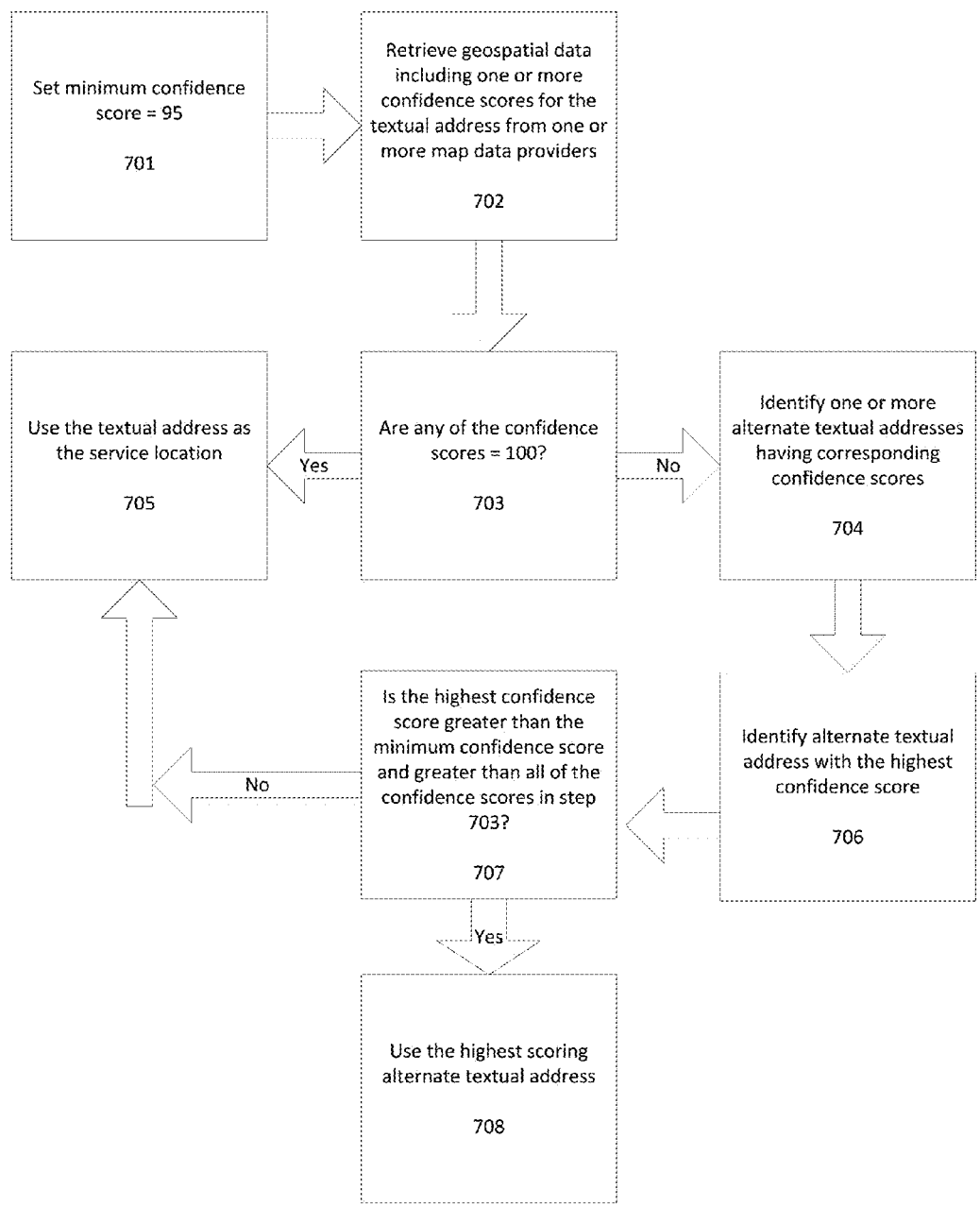
FIG. 7 illustrates an example of screening a textual address according to an exemplary embodiment.

FIG. 7 illustrates an example of screening a textual address according to an exemplary embodiment. At step 701 the minimum confidence score can be set to the predetermined threshold, 95% in this example. At step 702, geospatial data including one or more confidence scores is retrieved for the textual address from one or more map service providers. At step 703 it is determined whether any of the confidence scores are equal to 100. As discussed earlier, the confidence scores can be assumed to correlate to the precision accuracy of the geospatial database (for example, a precision accuracy below a first distance would correlate to a first confidence score and a precision accuracy below a second distance would correlate to a second confidence score). If so, then at step 705 the textual address is used as the service location (since at least one map service provider has verified with 100% certainty that the textual address is a valid address). Otherwise, then at step 704 one or more alternate textual addresses are identified which also have corresponding confidence scores (which can be retrieved from the map service providers or determined using the precision accuracy of the map service providers).

At step 706 the alternate textual address with the highest confidence score is identified. At step 707 it is determined whether the highest confidence score is greater than the minimum confidence score and all of the confidence scores calculated in step 703. If not, then at step 705 the original textual address is used as the service location. However, if the highest confidence score is greater than the minimum confidence score and greater than all of the confidence scores calculated in step 703, then at step 708 the highest scoring alternate textual address is used as the service location.

Returning to FIG. 5, at step 503 the service location is transmitted to a plurality of map service providers. At step 504 geospatial coordinates and a corresponding confidence score for each map service provider in the plurality of map service providers are determined for each map service provider in the plurality of map service providers. Each confidence score can correspond to a precision accuracy of each map service provider and can indicate an estimated accuracy of the geospatial coordinates to the service location;

As discussed previously, the confidence score can be provided by each of the plurality of map service providers or the confidence score can be determined from an assumed correlation between the precision accuracy of each map service provider and confidence score. In the latter case, the precision accuracy of the map service provider can be received from the map service provider or from another source.

At step 505 plurality of overall scores for the plurality of map service providers are calculated based at least in part on the precision accuracy of each map service provider and a plurality of attributes associated with each map service provider. This process is described in detail with reference to FIGS. 9 and 10A-10C.

At step 506 a map service provider is selected from the plurality of map service providers based at least in part on the plurality of overall scores and the geospatial data from that map service provider is utilized to respond to service request. Additionally, at step 507 geospatial data provided by the selected map service provider is transmitted to a technician. The geospatial data can include the geospatial coordinates previously received from the selected map service provider in step 504.

Figure 8:
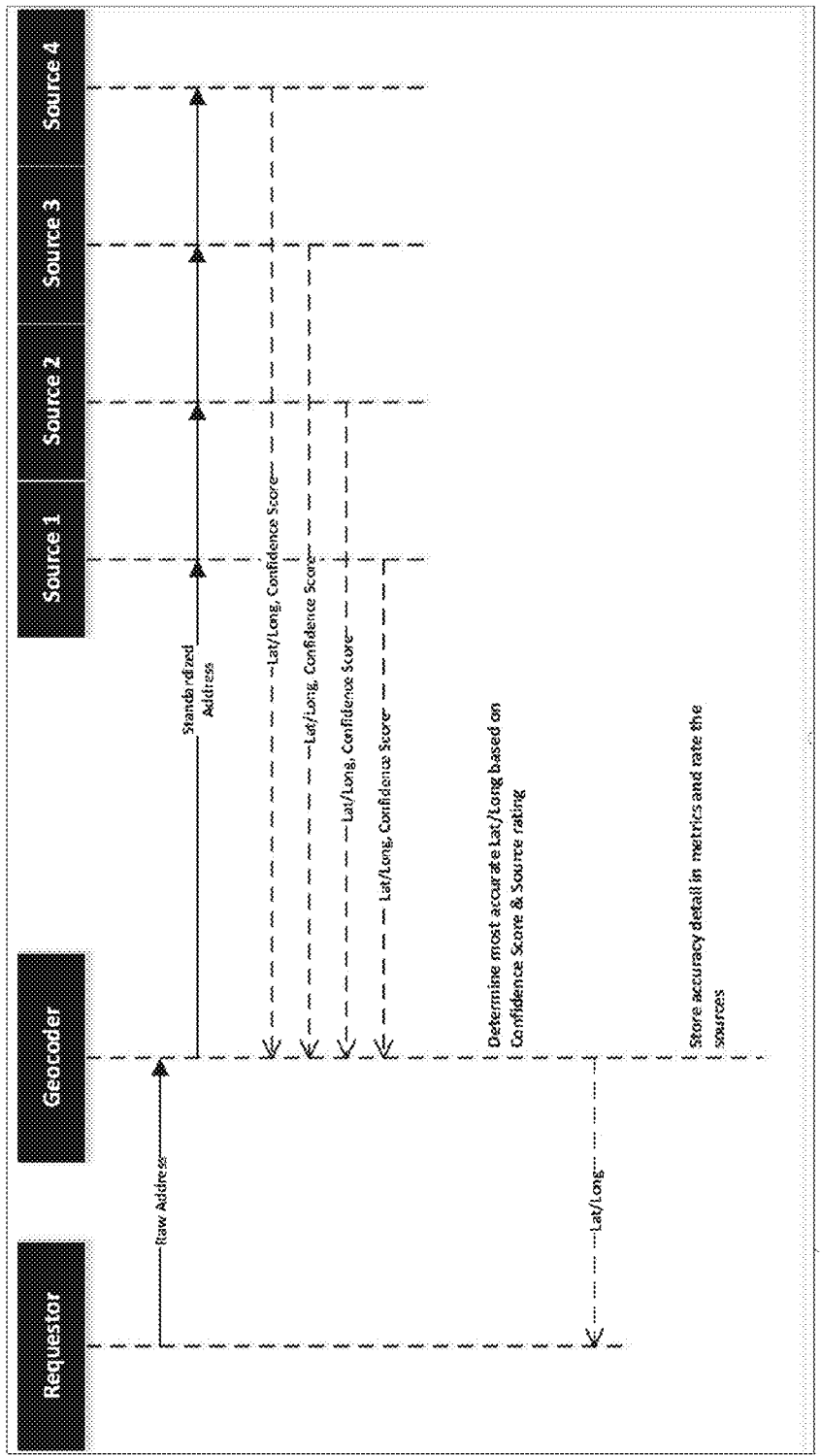
FIG. 8 illustrates a message diagram corresponding to the steps shown in FIG. 5.

FIG. 8 illustrates a message diagram corresponding to the steps shown in FIG. 5. As shown in FIG. 8, a raw address is provided to the geocoder. The geocoder can then use some type of validation logic to validate, screen, and/or reformat the raw address into a standardized address, as discussed previously. For example, if the raw address mistakenly states "Richmond Street" and the proper address is "Richmond Place," then the raw address can be replaced with the proper address by the geocoder.

As shown in FIG. 8, the standardized address is then sent to four different map service providers (sources 1-4), which each return a latitude and longitude and a confidence score corresponding to the latitude and longitude. Of course, as discussed above, a precision accuracy can be received rather a confidence score and the confidence score can instead be determined based on a correlation between confidence scores and precision accuracy values. After receiving the coordinates and the confidence scores, the geocoder can determine the most accurate latitude and longitude and map service provider based on the confidence scores/precision accuracy values and a source rating/overall score which is calculated for each of the map service providers. The coordinates corresponding to the winning source are then sent back to the requestor and any accuracy metrics and details can be stored by the geocoder.

As explained earlier, a plurality of overall scores for the plurality of map service providers are calculated based at least in part on the on the confidence score and/or precision accuracy of each map service provider and a plurality of attributes associated with each map service provider. The purpose of these scores is to determine which map service provider will provide the most accurate geospatial data for a particular service request.

A wide variety of attributes associated with each of the map service providers can be used to calculate the overall scores for each of the map service providers. For example, the attributes associated with each map service provider can include a roads attribute which quantifies the quality of the map and road data provided by the map service provider, such as the points-of-interest (POIs), the quantity and quality of arterial roads, intersections, user-friendliness, etc.

The plurality of attributes can also include an available imagery attribute which quantifies the quality of available imagery provided by map service providers for various locations. Available imagery can include satellite imagery, photographic images captured of locations (such as the Google™ Streetview feature), three-dimensional models of locations provided by map service providers, and/or geotagged photos.

The plurality of attributes can also include a geographical suitability attribute which quantifies the suitability of maps provided by the map service provider for different geographies, such as different cities, rural areas versus urban areas, or different countries. For example, a first map service provider may have better maps in a first country and poor maps for a second country, while a second map service provider may have better maps for the second country. Additionally, some map services providers may have high quality maps of tier 1 and tier 2 cities but very poor quality maps of any other areas, whereas others may have high quality maps of both suburban and urban areas.

Another attribute which can be utilized to determine an overall score for a map service provider is the precision accuracy attribute which was discussed earlier and which quantifies as a distance the precision of geo-coordinates provided for a particular service location by the map service provider. The precision accuracy can refer to the horizontal accuracy of the geo-coordinates provided by the map service provider. For example, the precision accuracy can indicate the distance range in meters from which the geo-coordinates provided by a map service provider can be certified accurate at a confidence level of 99%.

FIG. 9 illustrates a flowchart for calculating an overall score for a map service provider in a plurality of map service providers according to an exemplary embodiment. This process can be repeated for each map service provider to generate a plurality of overall scores corresponding to the plurality of map service providers.

At step 901 a first ranking is assigned to the precision accuracy based at least in part on a plurality of precision accuracy ranking tiers. The first ranking can reflect where the precision accuracy for the map service provider falls within a range of possible precision accuracies. As discussed previously, this precision accuracy can be provided by the map service provider and can be a distance within which the geo-coordinates provided by the map service provider meet a minimum confidence threshold as corresponding to the service location.

At step 902 a second ranking is assigned to the roads attribute of the map service provider based at least in part on a plurality of roads attribute ranking tiers. The second ranking can reflect where the roads attribute for the map service provider falls within a range of possible roads attributes.

At step 903 a third ranking is assigned to the available imagery attribute of the map service provider based at least in part on a plurality of available imagery attribute ranking tiers. The third ranking can reflect where the available imagery attribute for the map service provider falls within a range of possible available imagery attributes.

At step 904 a fourth ranking is assigned to the geographic suitability attribute of the map service provider based at least in part on a plurality of geographic suitability attribute ranking tiers. The fourth ranking can reflect where the geographic suitability attribute for the map service provider falls within a range of possible geographic suitability attributes.

At step 905 an overall score for the map service provider is calculated based at least in part on the first ranking, the second ranking, the third ranking, and the fourth ranking Of course, the method for determining an overall score for a map service provider shown in FIG. 9 is provided for illustration only, and the overall score can be calculated on greater or fewer attributes of the map service provider, as well as different attributes.

The process of calculating the overall score for a particular map service provider can include multiplying each of the ranking values by a weight which reflects the relative importance of the attribute which is ranked. For example, if there are N overall attributes resulting in N rankings, then the overall score for a map service provider can be calculated as the sum of the product of each ranking and each corresponding weight:

Overall Score=(Ranking$_1$×Weight$_1$)+(Ranking$_2$× Weight$_2$)+ . . . (Ranking$_N$×Weight$_N$)

FIGS. 10A-10C illustrate an example of the criteria, ranking tiers, and weights that can be used for the process shown in FIG. 9. Box 1001 in FIG. 10A illustrates the overall calculation that is performed to determine the overall score for a particular map service provider, as discussed above. The rank of each contributing factor (attribute) is multiplied by a weight to generate a product for that factor and all products are summed to generate the overall score.

Box 1002 in FIG. 10B illustrates the plurality of ranking tiers for each of the attributes previously discussed in FIG. 9, including precision accuracy, roads, available imagery, and geographic suitability. As shown in box 1002, more desirable ranking tiers are according a higher numerical ranking value. For example, since a precision accuracy of less than 7 meters is more desirable than a precision accuracy of 8 to 10 meters, the less than 7 meters tier of precision accuracy is ranked "4" while the 8 to 10 meters tier is ranked "3." As shown in FIG. 10B, precision accuracy is listed as "precision accuracy with confidence score." This reflects the assumption that a high precision accuracy (meaning a low distance value) is correlated with a high confidence score. Of course, the tiers provided are for illustration only (and correspond to common values for map service providers) and the various ranking tiers can have a variety of possible distance ranges, including ranges which do not have any gaps (such as <7 m, 10 m>7 m, 50 m>10 m, >50 m).

Similarly, a map service provider which provides geospatial data for all cities and suburban areas is more desirable than a map service provider which only provides geospatial data for tier 1 and tier 2 cities, resulting in a higher ranking for the geographic suitability attribute for map service providers which provide greater geographic coverage. Additionally, a map service provider which provides road intersections can be more desirable than a map service provider which provides only points of interest or one which provides only turn by turn directions to a particular address.

Another example is the available imagery attribute. As shown in box 1002, satellite imagery is ranked higher than geotagged photos, which are ranked higher than handheld based photos, which are ranked higher than a 3d view. Therefore, a map service provider which provided satellite imagery of a location would have the highest ranking of 4 for the available imagery attribute. Optionally, the map service provider can receive credit for more than one possible ranking. For example, if the map service provider provides satellite imagery and a three-dimensional view of a location, then the rank can be the sum of the rankings for those two tiers. In this case, the ranking for that map service provider for the available imagery attribute would be 4+1=5.

Also shown in box 1002 is the weighting for each of the attributes or contributing factors used to generate the overall score for each map service provider. For example, the precision accuracy is weighted 30% while the roads attribute is weighted 25%. This weighting is multiplied by each of the ranking values corresponding to each of the tiers to generate a product which is the total index for that attribute. The index values for each of the ranking tiers for each of the attributes are also shown in box 1002 of FIG. 10B.

FIG. 10C illustrates some example preference indices which can be used to filter map service providers. The sample values shown in box 1003 of FIG. 10C can serve as minimum values required to select any map service provider. For example, the preferred index for the roads attribute is at least 0.5, which corresponds to, at a minimum, point-of-interest features for the roads attribute.

Of course, the weights and preferred indices in FIGS. 10A-10C are provided for explanation only, and a wide variety of weights can be chosen for each of the attributes, depending on the requirements of particular service requests, circumstances of the requests, and geographic areas involved.

As discussed earlier, once the overall scores have been calculated and a map service provider has been selected, geospatial data including coordinates of the service location which are provided by the selected map service provider are transmitted to a technician who can respond to the service request.

Figure 11:
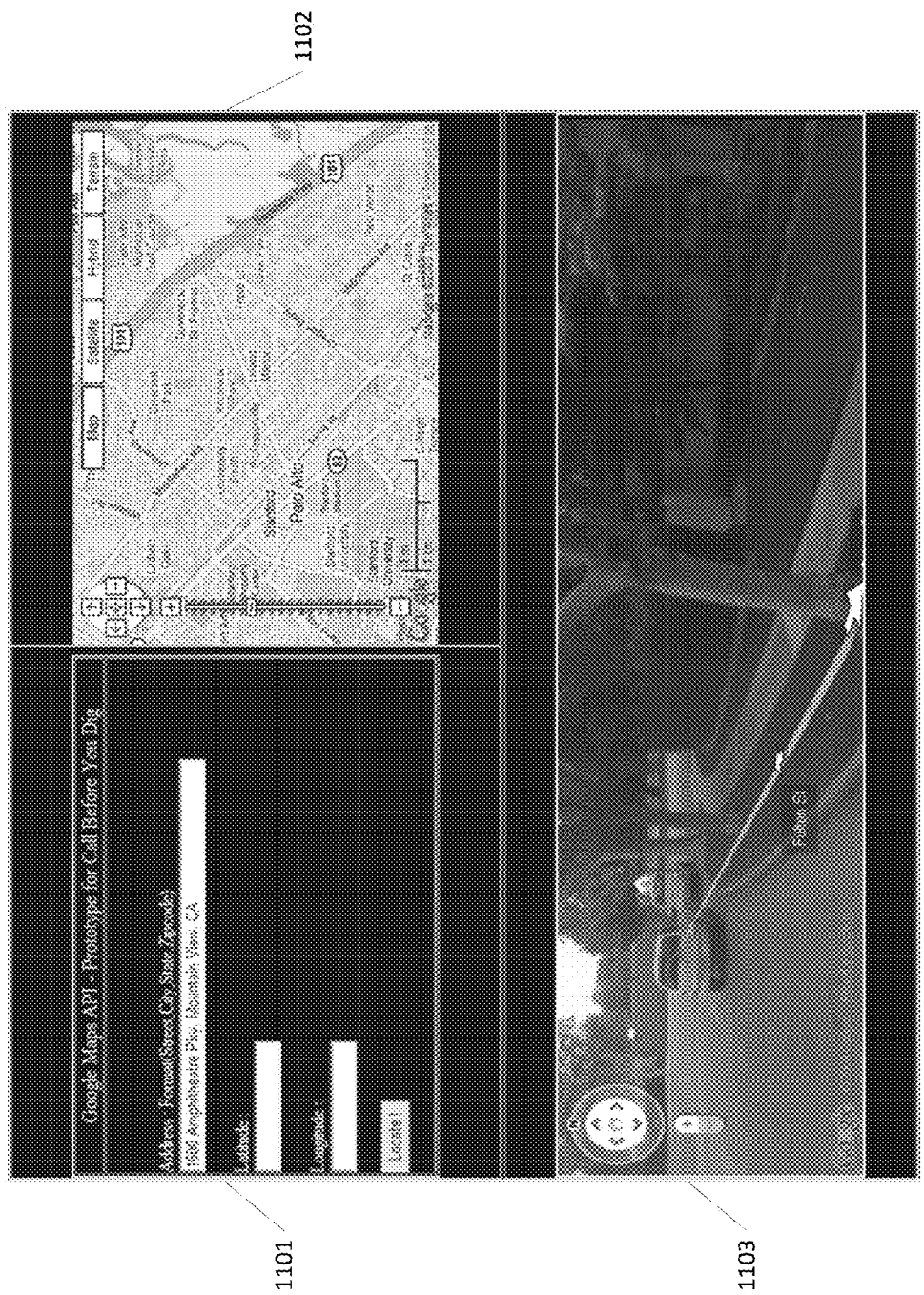
FIG. 11 illustrates a sample map interface which can be populated with the geospatial data once a map service provider is selected.

Transmitting the geospatial data can include populating a map interface accessible to the technician with the geospatial data. For example, FIG. 11 illustrates a sample map interface which can be populated with the geospatial data once a map service provider is selected. Interface 1101 can be used to input the service location and to receive the resulting geospatial coordinates (in latitude and longitude). Interface 1102 can include a first indicator corresponding to a location of the technician (and one or more additional technicians) and a second indicator corresponding to the geospatial coordinates received from the selected map service provider. Additionally, interface 1103 can include one or more images, photographs, or 3d models corresponding to the geospatial coordinates received from the selected map service provider. Optionally, the technician can review the data in interface 1103 and verify that the location is correct. If the technician indicates that the location is incorrect, the process can be repeated with a different map service provider or group of map service providers to generate a different set of geospatial coordinates. Interface 1103 can be used by a technician to verify the location since the service request being assigned to the technician will refer to some assets which are at the service location. The technician can inspect the visual information presented in interface 1103 to verify that the assets are present and confirm the accuracy of the location.

Figure 12A:
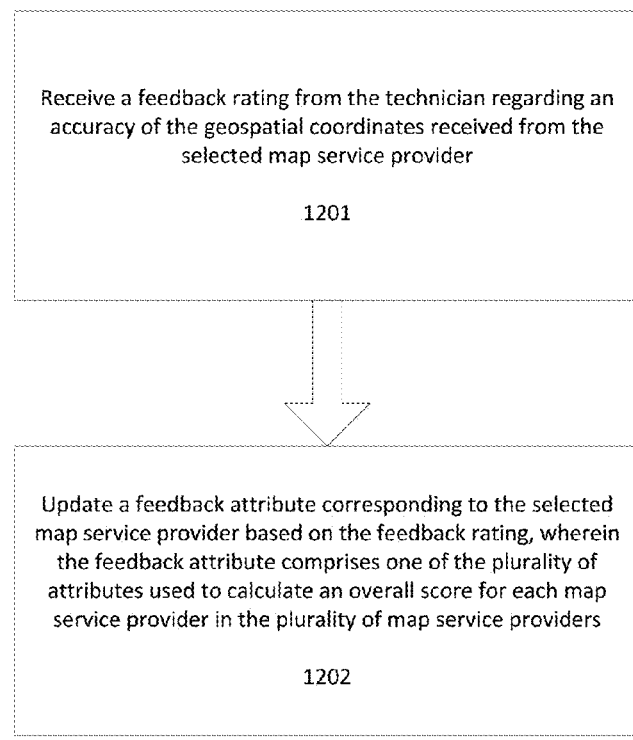
FIGS. 12A-12B illustrate a flowchart and interface for integrating feedback from a technician regarding the accuracy of coordinates that were previously provided for a particular service request.
Figure 12B:
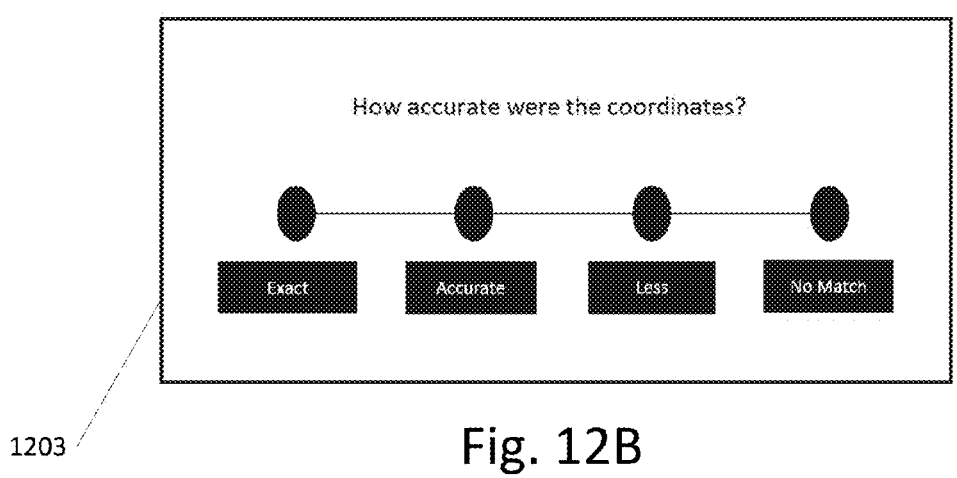

FIG. 12A illustrates a flowchart for integrating feedback from a technician regarding the accuracy of coordinates that were previously provided for a particular service request. At step 1201 a feedback rating is received from the technician regarding an accuracy of the geospatial coordinates received from the selected map service provider. This can be received using an interface and menu such as the interface 1203 shown in FIG. 12B. The technician can be prompted to provide their rating after each service request is completed.

At step 1202 a feedback attribute corresponding to the selected map service provider is updated based on the feedback rating. The feedback attribute can be one of the plurality of attributes or factors utilized in the overall score calculation process for each of the plurality of map service providers. Therefore, if a particular map service provider receives multiple negative ratings from technicians, it is less likely that the map service provider will be selected to provide geospatial data for future service requests. The feedback ratings, like any of the other attributes, can also be grouped according to geographic areas, so that negative ratings in one area do not affect the overall score calculation for that map service provider in other areas where the map service provider may be more accurate.

Additionally, the feedback attribute can be used to diagnose or detect underlying problems in the overall score calculation process. For example, if the overall score calculation consistently selects a particular map service provider but that map service provider receives poor feedback ratings, then the methodology used to calculate the overall scores can be revised automatically using a feedback loop (such as by changing the weighting associated with different attributes, revising underlying assumptions regarding precision accuracy and confidence score, or performing other modifications to the overall score calculation process).

Figure 13:
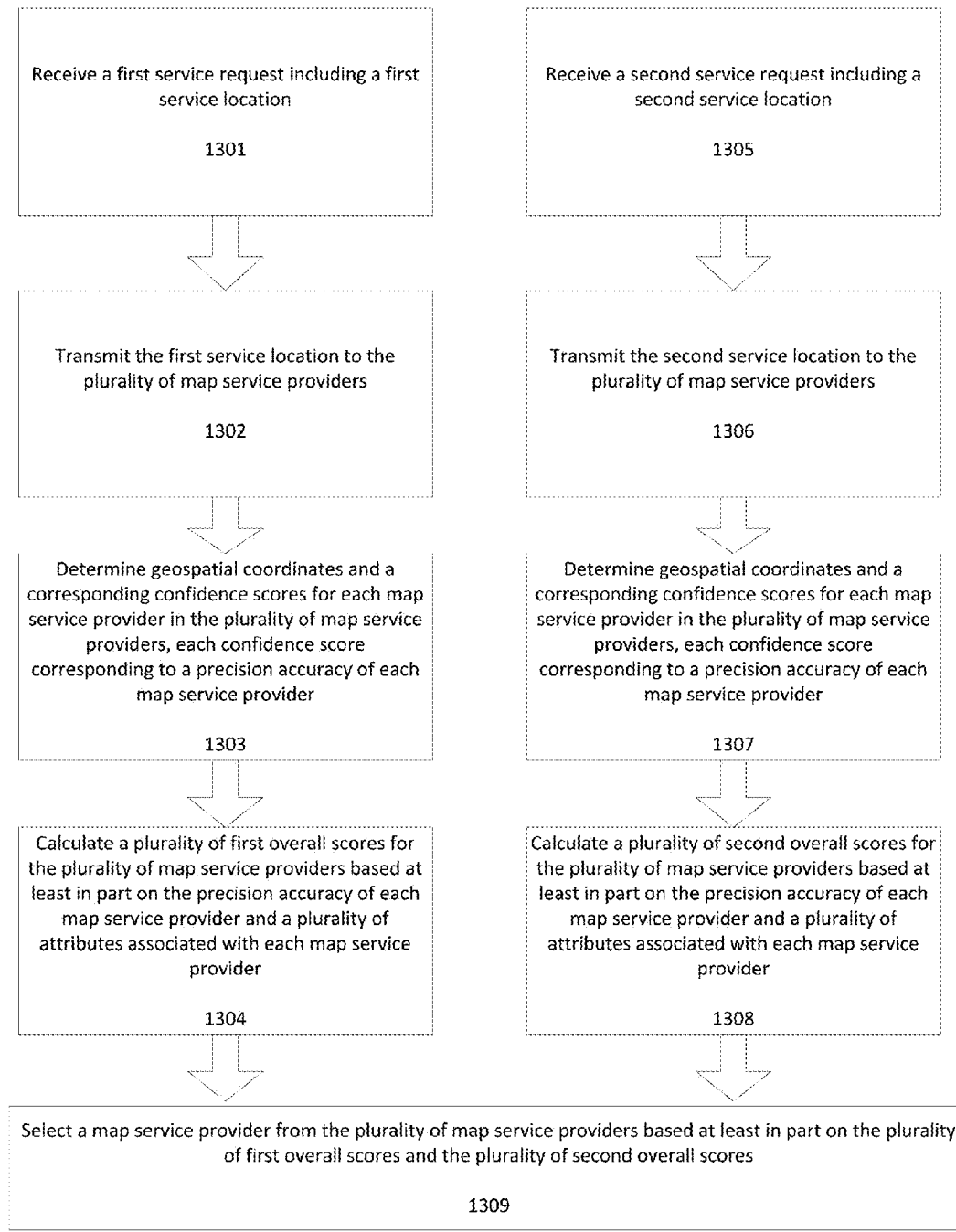
FIG. 13 illustrates a flowchart for optimizing efficiency of a workforce management system when handling multiple service requests according to an exemplary embodiment.

FIG. 13 illustrates a flowchart for optimizing efficiency of a workforce management system when handling multiple service requests according to an exemplary embodiment. Steps 1301-1304 are similar to steps 501 and 503-505 of FIG. 5, in that a first service request including a first service location is received, the first service location is transmitted to a plurality of map service providers, geospatial coordinates and corresponding confidence scores are determined for each of the plurality of map service providers, each confidence score corresponding to a precision accuracy of each map service provider, and a plurality of first overall scores are calculated for each of the plurality of map service providers based at least in part on the precision accuracy of each map service provider and a plurality of attributes associated with each map service provider.

At step 1305 a second service request including a second service location is received. Optionally, the method can include determining whether the second service location is approximately within the same general vicinity as the first service location (such as the same neighborhood, city, or range of a predetermined number of miles or kilometers).

At step 1306 the second service location is transmitted to the plurality of map service providers and at step 1307 second geospatial coordinates and a corresponding second confidence score is determined for each map service provider in the plurality of map service providers, each confidence score corresponding to a precision accuracy of each map service provider. The second confidence score indicates an estimated accuracy of the second geospatial coordinates to the second service location.

At step 1308 a plurality of second overall scores are calculated for the plurality of map service providers based at least in part on the second confidence score received from each map service provider and the plurality of attributes associated with each map service provider.

At step 1309, a map service provider is selected from the plurality of map service providers based at least in part on the plurality of overall scores and the plurality of second overall scores. For example, a map service provider having the highest combined overall score can be selected, where the combined overall score is an average score and computed as the average of the first overall score and the second overall score.

Of course, the process of FIG. 13 can be expanded for situations where more than two service requests are being handled and the criteria for determining the combined overall score can vary depending on the particular circumstances and user preferences. For example, if one hundred sets of overall scores are calculated for each map service provider corresponding to one hundred service requests, then the combined overall score can be based on the number of times a map service provider is the top-ranked map service provider. Therefore, if a map service provider was ranked first fifty-one times out of hundred, they would have the highest combined overall score and be selected as the map service provider for all one hundred jobs, even if the average score for that map service provider was lower than other map service providers.

The process shown in FIG. 13 has the advantage of allowing the service requests to be processed in batches (such as all of the service requests in a particular geographic area) and of selecting a single map service provider to provide the geospatial data and coordinates for all of the service requests. This increases the efficiency of the overall process since the requests for geospatial data (such as map information and driving directions) can be consolidated into a single call to the map service provider which provides the most accurate combined results for the service requests.

Figure 14:
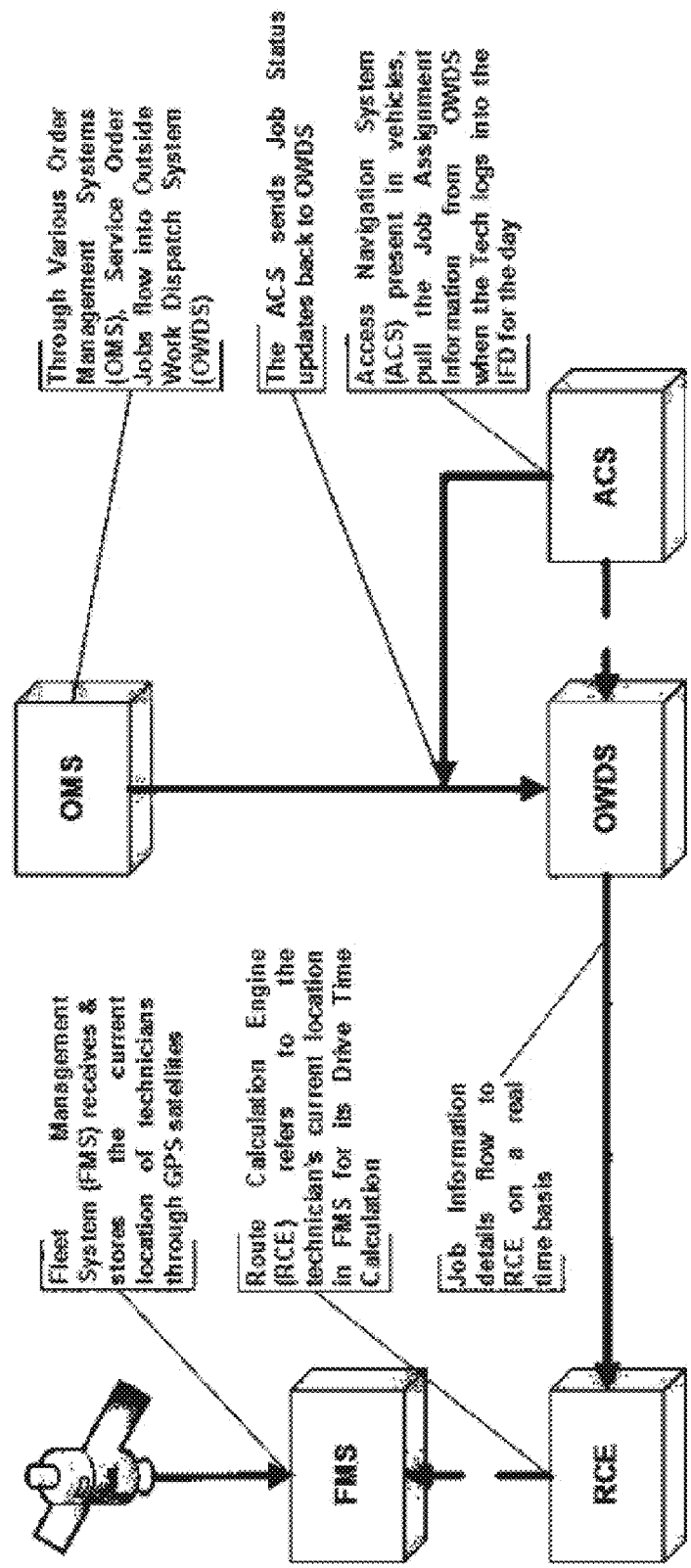
FIG. 14 illustrates components of the workforce management system according to an exemplary embodiment.

FIG. 14 illustrates components of the workforce management system according to an exemplary embodiment. As shown in FIG. 14, the workforce management system is a standalone solution having intelligence utilizing a map-based ticketing system (classification, prioritizing), a map-based dispatch (real time scheduling) and map-based routing (drive direction, travel time). Although the workforce management system can be integrated with allied systems, the workforce management system can be completely map-based, including incident reporting (ticket resolution) and map-based optimized workforce allocation.

Real time tickets can be picked up from the map, with dynamic allocation of workforce taking real world attributes and fleets can be organized with proper drive-time and drive direction. In other words, since all tickets and service requests will have locations (addresses), the workforce management system can plot the tickets on the map and every decision and processing step, such as ticket assignment, allocation, dispatch, drive-time estimation, and directional guidance can be implemented using map-based Geographic Information Systems. Using the workforce management system described herein, all of the relevant data objects, such as tickets, assignments, allocations for each technician, etc. are encoded in geospatial objects which all have a location attribute.

The workforce management system can be built with loosely coupled service-oriented architecture and Web services so that any system can be integrated with the core system. For example, any billing system, Customer Relationship Management (CRM), or reporting system can be integrated into the workforce management system. Of course, the components of FIG. 14 are provided for illustration only, and the actual components of a system which implements the techniques described herein can be greater or fewer.

Figure 15:
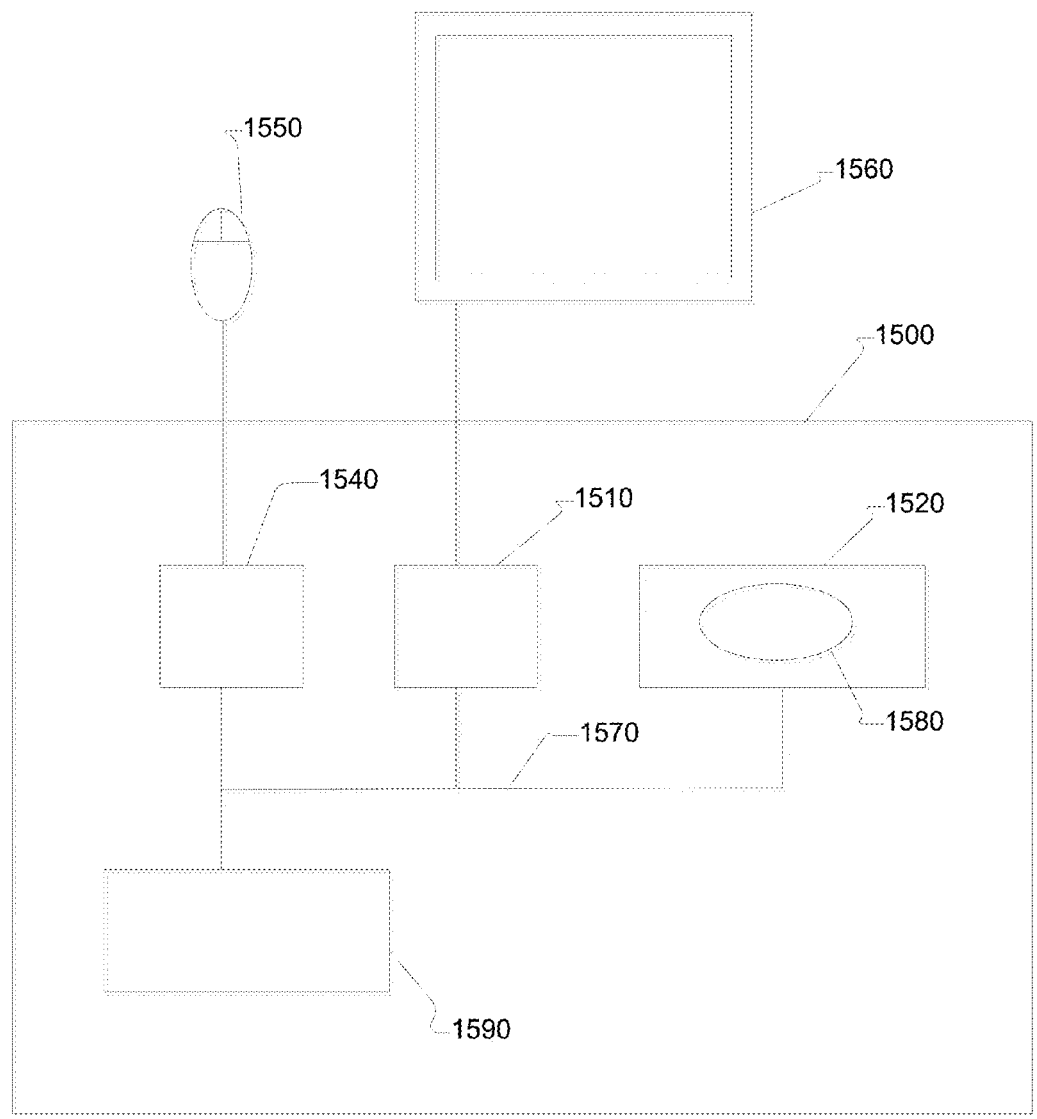
FIG. 15 shows an exemplary computing device useful for implementing systems and performing methods disclosed herein.

One or more of the above-described techniques may be implemented in or involve one or more computer systems. FIG. 15 illustrates a generalized example of a computing environment 1500. The computing environment 1500 is not intended to suggest any limitation as to scope of use or functionality of a described embodiment. Computing environment 1500 can be used to perform any of the steps described in this application and/or can be part of the UAV devices described in this application.

With reference to FIG. 15, the computing environment 1500 includes at least one processing unit 1510 and memory 1520. The processing unit 1510 executes computer-executable instructions and may be a real or a virtual processor. In a multi-processing system, multiple processing units execute computer-executable instructions to increase processing power. The memory 1520 may be volatile memory (e.g., registers, cache, RAM), non-volatile memory (e.g., ROM, EEPROM, flash memory, etc.), or some combination of the two. The memory 1520 may store software instructions 1580 for implementing the described techniques when executed by one or more processors. Memory 1520 may be one memory device or multiple memory devices.

A computing environment may have additional features. For example, the computing environment 1500 includes storage 1540, one or more input devices 1550, one or more output devices 1560, and one or more communication connections 1590. An interconnection mechanism 1570, such as a bus, controller, or network interconnects the components of the computing environment 1500. Typically, operating system software or firmware (not shown) provides an operating environment for other software executing in the computing environment 1500, and coordinates activities of the components of the computing environment 1500.

The storage 1540 may be removable or non-removable, and includes magnetic disks, magnetic tapes or cassettes, CD-ROMs, CD-RWs, DVDs, or any other medium which may be used to store information and which may be accessed within the computing environment 1500. The storage 1540 may store instructions for the software 1580.

The input device(s) 1550 may be a touch input device such as a keyboard, mouse, pen, trackball, touch screen, or game controller, a voice input device, a smayning device, a digital camera, remote control, or another device that provides input to the computing environment 1500. The output device(s) 1560 may be a display, television, monitor, printer, speaker, or another device that provides output from the computing environment 1500.

The communication connection(s) 1590 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations may be described in the general context of computer-readable media. Computer-readable media are any available media that may be accessed within a computing environment. By way of example, and not limitation, within the computing environment 1500, computer-readable media include memory 1520, storage 1540, communication media, and combinations of any of the above.

Of course, FIG. 15 illustrates computing environment 1500, display device 1560, and input device 1550 as separate devices for ease of identification only. Computing environment 1500, display device 1560, and input device 1550 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing environment 1500 may be a set-top box, mobile device, personal computer, or one or more servers, for example a farm of networked servers, a clustered server environment, or a cloud network of computing devices.

Having described and illustrated the principles of our invention with reference to the described embodiment, it will be recognized that the described embodiment may be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiment shown in software may be implemented in hardware and vice versa.

Embodiments disclosed herein may be useful for dynamically dispatching a workforce to provide optimal services while minimizing cost. By integrating real-time workforce location information with consistently up-to-date maps, workforce management systems disclosed herein may fluidly and substantially continuously reroute members of the workforce as needs change. By integrating with existing services, such as GOOGLE™ MAPS or one or more other mapping services, cost in creating and maintaining such a workforce management system may be substantially reduced while reliability of such a system (e.g., vintage of map information) improved.

Workforce management systems disclosed herein may additionally be scalable. For example, a central workforce management system may manage separate work forces (e.g., workforces for non-related companies and/or relating to non-related services). For example, both work tickets and technicians may be identified as corresponding to a certain business to ensure the correct technicians are assigned to the correct work tickets. Further, such combined systems may be optimized for various business rules. For example, such services may include referral services or substitute services so that if the company that received a work ticket does not have the bandwidth or expertise to respond to the work ticket, they may refer the work ticket to a company who can.

Workforce management systems disclosed herein may be hosted by an entity in similar fashion to conventional workforce management systems, for example by having one or more computing device hosting the workforce management system located at an entity's office. Alternatively, workforce management systems disclosed herein may be implemented according to a hosted services model. For example, a workforce management system may be offered as a service (i.e., as Software as a Service ("SaaS")). This may allow a company to simply provide its technician, vehicle tracking, and similar data to the workforce management system over an internet connection and the workforce management system can be completely hosted and provided by a third party entity. In this fashion, even companies with meager means may be able to afford sophist acted workforce management systems.

In view of the many possible embodiments to which the principles of our invention may be applied, we claim as our invention all such embodiments as may come within the scope and spirit of the following claims and the present disclosure and equivalents thereto.

What is claimed is:

1. A method executed by one or more computing devices for optimizing efficiency of a workforce management system, said method comprising:
   receiving, by at least one of the one or more computing devices, a service request, wherein the service request includes a service location;
   transmitting, by at least one of the one or more computing devices, the service location to a plurality of map service providers implemented on one or more remote server computers;
   determining, by at least one of the one or more computing devices and for the respective map service providers, geospatial coordinates of the service location and a corresponding confidence score for the map service provider,
   wherein the respective confidence scores correspond to a precision accuracy of the corresponding map service provider, and wherein the precision accuracy represents an estimated accuracy of the determined geospatial coordinates of the service location as compared to the actual physical location of the service location;
   calculating, by at least one of the one or more computing devices, overall scores for the respective map service providers based at least in part on the precision accuracy of the map service provider and a plurality of attributes associated with the map service provider, wherein the respective attributes reflect digital geographic data representing an area including the actual physical location of the service location, and
   wherein the respective overall scores indicate a quality level of geospatial data, corresponding to the area, that is available from the map service provider;
   selecting, by at least one of the one or more computing devices, a map service provider from the plurality of map service providers based at least in part on the plurality of overall scores; and
   transmitting, by at least one of the one or more computing devices, geospatial data provided by the selected map service provider to a computing device associated with a technician, wherein the geospatial data includes the determined geospatial coordinates for the selected map service provider.

2. The method of claim 1, wherein the service location comprises one or more of a textual address, a point-of-interest, or geospatial coordinates.

3. The method of claim 1, wherein the service location comprises a textual address and further comprising:
   screening, by at least one of the one or more computing devices, the textual address prior to transmitting the service location to the plurality of map service providers.

4. The method of claim 3, wherein screening the textual address prior to transmitting the service location to a plurality of map service providers comprises:
   determining one or more confidence scores for the textual address based at least in part on geospatial data in one or more geospatial databases;
   identifying one or more alternate textual addresses based at least in part on a determination that all of the one or more confidence scores for the textual address are less than 100, wherein each of the one or more alternate textual addresses has a corresponding confidence score; and
   replacing the textual address with an alternate textual address in the one or more alternate textual addresses based at least in part on a determination that a confidence score corresponding to the alternate textual address is greater than the one or more confidence scores for the textual address and a determination that the confidence score corresponding to the alternate textual address is greater than a predetermined minimum confidence score.

5. The method of claim 1, wherein the plurality of attributes associated with the respective map service providers comprise a roads attribute, an available imagery attribute, and a geographical suitability attribute, and wherein calculating overall scores for the respective map service providers comprises, for the respective map service providers:
   assigning a first ranking to the precision accuracy of the map service provider based at least in part on a plurality of precision accuracy ranking tiers;
   assigning a second ranking to the roads attribute based at least in part on a plurality of roads attribute ranking tiers;
   assigning a third ranking to the available imagery attribute based at least in part on a plurality of available imagery attribute ranking tiers;

assigning a fourth ranking to the geographical suitability attribute based at least in part on a plurality of geographical suitability attribute ranking tiers; and calculating the overall score for the map service provider based at least in part on the first ranking, the second ranking, the third ranking, and the fourth ranking.

6. The method of claim 5, wherein calculating the overall score for the map service provider based at least in part on the first ranking, the second ranking, the third ranking, and the fourth ranking comprises:

multiplying each of the first ranking, the second ranking, the third ranking, and the fourth ranking by a corresponding weight factor to generate a first product, a second product, a third product, and a fourth product; and summing the first product, the second product, the third product, and the fourth product to generate the overall score for the map service provider.

7. The method of claim 1, wherein transmitting geospatial data provided by the selected map service provider to a computing device associated with a technician comprises:

populating a map interface accessible to the technician with the geospatial data, wherein the map interface includes a first indicator corresponding to a location of the technician and a second indicator corresponding to the geospatial coordinates received from the selected map service provider.

8. The method of claim 7, wherein the geospatial data includes one or more images corresponding to the geospatial coordinates received from the selected map service provider.

9. The method of claim 1, further comprising:

receiving, by at least one of the one or more computing devices, a feedback rating from the computing device associated with the technician regarding an accuracy of the determined geospatial coordinates transmitted to the computing device associated with the technician; and updating, by at least one of the one or more computing devices, a feedback attribute corresponding to the selected map service provider based on the feedback rating, wherein the feedback attribute comprises one of the plurality of attributes used to calculate the overall score for each map service provider in the plurality of map service providers.

10. The method of claim 1, further comprising:

receiving, by at least one of the one or more computing devices, a second service request, wherein the second service request includes a second service location;

transmitting, by at least one of the one or more computing devices, the second service location to the plurality of map service providers;

determining, by at least one of the one or more computing devices, second geospatial coordinates and a corresponding second confidence score for each map service provider in the plurality of map service providers, wherein the respective second confidence scores correspond to a precision accuracy of the corresponding map service provider, and wherein the precision accuracy represents an estimated accuracy of the determined geospatial coordinates of the service location as compared to the actual physical location of the service location; and calculating, by at least one of the one or more computing devices, a plurality of second overall scores for the respective map service providers based at least in part on the precision accuracy of the map service provider and the plurality of attributes associated with the map service provider.

11. The method of claim 10, wherein selecting a map service provider from the plurality of map service providers comprises:

selecting a map service provider from the plurality of map service providers based at least in part on the plurality of overall scores and the plurality of second overall scores.

12. An apparatus for optimizing efficiency of a workforce management system, the apparatus comprising:

one or more processors; and one or more memories operatively coupled to at least one of the one or more processors and having instructions stored thereon that, when executed by at least one of the one or more processors, cause at least one of the one or more processors to:

receive a service request, wherein the service request includes a service location;

transmit the service location to a plurality of map service providers implemented on one or more remote server computers;

determine geospatial coordinates and a corresponding confidence score for the respective map service providers, wherein the respective confidence scores correspond to a precision accuracy of the corresponding map service provider, and wherein the precision accuracy represents an estimated accuracy of the determined geospatial coordinates of the service location as compared to the actual physical location of the service location;

calculate overall scores for the respective map service providers based at least in part on the precision accuracy of the map service provider and a plurality of attributes associated with the map service provider, wherein the respective attributes reflect digital geographic data representing an area including the actual physical location of the service location, and wherein the respective overall scores indicate a quality level of geospatial data, corresponding to the area, that is available from the map service provider;

select a map service provider from the plurality of map service providers based at least in part on the plurality of overall scores; and transmit geospatial data provided by the selected map service provider to a computing device associated with a technician, wherein the geospatial data includes the determined geospatial coordinates for the selected map service provider.

13. The apparatus of claim 12, wherein the service location comprises a textual address and wherein at least one of the one or more memories has further instructions stored thereon that, when executed by at least one of the one or more processors, cause at least one of the one or more processors to:

screen the textual address prior to transmitting the service location to the plurality of map service providers.

14. The apparatus of claim 12, wherein the plurality of attributes associated with the respective map service providers comprises a roads attribute, an available imagery attribute, and a geographical suitability attribute and wherein the instructions that, when executed by at least one of the one or more processors, cause at least one of the one or more processors to calculate a plurality of overall scores for the respective map service providers further cause at least one of the one or more processors to, for the respective map service providers:
  assign a first ranking to the precision accuracy of the map service provider based at least in part on a plurality of precision accuracy ranking tiers;
  assign a second ranking to the roads attribute based at least in part on a plurality of roads attribute ranking tiers;
  assign a third ranking to the available imagery attribute based at least in part on a plurality of available imagery attribute ranking tiers;
  assign a fourth ranking to the geographical suitability attribute based at least in part on a plurality of geographical suitability attribute ranking tiers; and
  calculate the overall score for the map service provider based at least in part on the first ranking, the second ranking, the third ranking, and the fourth ranking.

15. The apparatus of claim 14, wherein the instructions that, when executed by at least one of the one or more processors, cause at least one of the one or more processors to calculate an overall score for the map service provider based at least in part on the first ranking, the second ranking, the third ranking, and the fourth ranking further cause at least one of the one or more processors to:
  multiply each of the first ranking, the second ranking, the third ranking, and the fourth ranking by a corresponding weight factor to generate a first product, a second product, a third product, and a fourth product; and
  sum the first product, the second product, the third product, and the fourth product to generate the overall score for the map service provider.

16. At least one non-transitory computer-readable medium storing computer-readable instructions that, when executed by one or more computing devices, cause at least one of the one or more computing devices to:
  receive a service request, wherein the service request includes a service location;
  transmit the service location to a plurality of map service providers implemented on one or more remote server computers;
  determine geospatial coordinates and a corresponding confidence score for the respective map service providers, wherein the respective confidence scores correspond to a precision accuracy of the corresponding map service provider, and wherein the precision accuracy represents an estimated accuracy of the determined geospatial coordinates of the service location as compared to the actual physical location of the service location;
  calculate overall scores for the respective map service providers based at least in part on the precision accuracy of the map service provider and a plurality of attributes associated with the map service provider, wherein the respective attributes reflect digital geographic data representing an area including the actual physical location of the service location, and wherein the respective overall scores indicate a quality level of geospatial data, corresponding to the area, that is available from the map service provider;
  select a map service provider from the plurality of map service providers based at least in part on the plurality of overall scores; and
  transmit geospatial data provided by the selected map service provider to a computing device associated with a technician, wherein the geospatial data includes the determined geospatial coordinates for the selected map service provider.

17. The at least one non-transitory computer-readable medium of claim 16, wherein the service location comprises a textual address and further storing computer-readable instructions that, when executed by at least one of the one or more computing devices, cause at least one of the one or more computing devices to:
  screen the textual address prior to transmitting the service location to the plurality of map service providers.

18. The at least one non-transitory computer-readable medium of claim 16, wherein the plurality of attributes associated with the respective map service providers comprises a roads attribute, an available imagery attribute, and a geographical suitability attribute and wherein the instructions that, when executed by at least one of the one or more processors, cause at least one of the one or more processors to calculate a plurality of overall scores for the respective map service providers further cause at least one of the one or more processors to, for the respective map service providers:
  assign a first ranking to the precision accuracy of the map service provider based at least in part on a plurality of precision accuracy ranking tiers;
  assign a second ranking to the roads attribute based at least in part on a plurality of roads attribute ranking tiers;
  assign a third ranking to the available imagery attribute based at least in part on a plurality of available imagery attribute ranking tiers;
  assign a fourth ranking to the geographical suitability attribute based at least in part on a plurality of geographical suitability attribute ranking tiers; and
  calculate the overall score for the map service provider based at least in part on the first ranking, the second ranking, the third ranking, and the fourth ranking.

19. The at least one non-transitory computer-readable medium of claim 18, wherein the instructions that, when executed by at least one of the one or more computing devices, cause at least one of the one or more computing devices to calculate an overall score for the map service provider based at least in part on the first ranking, the second ranking, the third ranking, and the fourth ranking further cause at least one of the one or more computing devices to:
  multiply each of the first ranking, the second ranking, the third ranking, and the fourth ranking by a corresponding weight factor to generate a first product, a second product, a third product, and a fourth product; and
  sum the first product, the second product, the third product, and the fourth product to generate the overall score for the map service provider.

* * * * *